United States Patent
Gießibl et al.

(10) Patent No.: US 12,187,294 B2
(45) Date of Patent: Jan. 7, 2025

(54) DIFFERENTIAL TRANSFER CASE TORQUE SENSOR APPARATUS AND METHOD

(71) Applicant: Methode Electronics, Inc., Chicago, IL (US)

(72) Inventors: Johannes Gießibl, Amerang (DE); Chad Reed, Ypsilanti, MI (US)

(73) Assignee: Methode Electronics, Inc., Chicago, IL (US)

( * ) Notice: Subject to any disclaimer, the term of this patent is extended or adjusted under 35 U.S.C. 154(b) by 1023 days.

(21) Appl. No.: 17/155,507

(22) Filed: Jan. 22, 2021

(65) Prior Publication Data

US 2021/0229679 A1 Jul. 29, 2021

Related U.S. Application Data

(60) Provisional application No. 62/990,270, filed on Mar. 16, 2020, provisional application No. 62/964,946, filed on Jan. 23, 2020.

(51) Int. Cl.
*B60W 10/119* (2012.01)
*B60W 10/18* (2012.01)
(Continued)

(52) U.S. Cl.
CPC .......... *B60W 40/12* (2013.01); *B60W 10/119* (2013.01); *B60W 10/18* (2013.01);
(Continued)

(58) Field of Classification Search
CPC ..... B60W 10/18; B60W 40/12; B60W 10/119
See application file for complete search history.

(56) References Cited

U.S. PATENT DOCUMENTS

| 4,896,544 A | 1/1990 | Garshelis |
| 5,351,555 A | 10/1994 | Garshelis |

(Continued)

FOREIGN PATENT DOCUMENTS

| CN | 209852080 U | * | 12/2019 | |
| DE | 102016100553 A1 | * | 7/2016 | ............. B60K 23/08 |

OTHER PUBLICATIONS

Office Action dated Dec. 16, 2021 cited in German Application No. 10 2021 101.

*Primary Examiner* — Jamel E Williams
(74) *Attorney, Agent, or Firm* — Greenberg Traurig, LLP

(57) ABSTRACT

A magnetic torque sensing device having a torque transferring member with a magnetoelastically active region. The magnetoelastically active region has oppositely polarized magnetically conditioned regions with initial directions of magnetization that are perpendicular to the sensitive directions of magnetic field sensor pairs placed proximate to the magnetically active region. Magnetic field sensors are specially positioned in relation to the torque-transferring member to accurately measure torque while providing improved RSU performance and reducing the detrimental effects of compassing. The torque sensing devices are incorporated on vehicle drive train components, including differential components, transfer case components, transmission components, and others, including on power transmission shafts, half-shafts, and wheels, and output signals representing characteristics of the vehicle are processed in algorithms to provide useful output information for controlling actions of the vehicle.

20 Claims, 8 Drawing Sheets

(51) Int. Cl.
*B60W 30/18* (2012.01)
*B60W 40/12* (2012.01)
*G01L 3/10* (2006.01)
*B60K 17/344* (2006.01)

(52) U.S. Cl.
CPC ....... *B60W 30/18027* (2013.01); *G01L 3/101* (2013.01); *B60K 17/344* (2013.01); *B60W 2420/50* (2013.01); *B60W 2422/95* (2013.01); *B60W 2510/0208* (2013.01); *B60W 2510/1005* (2013.01); *B60W 2510/105* (2013.01); *B60W 2510/12* (2013.01); *B60W 2520/26* (2013.01); *B60W 2530/10* (2013.01); *B60W 2710/18* (2013.01)

(56) References Cited

U.S. PATENT DOCUMENTS

| | | | |
|---|---|---|---|
| 5,373,912 A * | 12/1994 | Haiki | B60K 23/0808 477/35 |
| 5,520,059 A | 5/1996 | Garshelis | |
| 6,047,605 A | 4/2000 | Garshelis | |
| 6,145,387 A | 11/2000 | Garshelis | |
| 6,260,423 B1 | 7/2001 | Garshelis | |
| 6,487,925 B2 * | 12/2002 | Fischer | C23G 3/023 74/337 |
| 6,513,395 B1 | 2/2003 | Jones | |
| 6,553,847 B2 | 4/2003 | Garshelis | |
| 8,087,304 B2 | 1/2012 | Lee | |
| 8,779,306 B2 | 7/2014 | Gauthier et al. | |
| 8,836,458 B2 * | 9/2014 | Lee | G01L 3/1435 73/862.331 |
| 9,151,686 B2 | 10/2015 | Barraco et al. | |
| 9,683,906 B2 | 6/2017 | Gießibl | |
| 10,151,652 B2 | 12/2018 | Gießibl | |
| 10,488,278 B2 | 11/2019 | Gießibl | |
| 2009/0082934 A1 * | 3/2009 | Mizon | B60K 23/0808 701/68 |
| 2009/0230953 A1 * | 9/2009 | Lee | G01L 3/102 73/862.321 |
| 2010/0235039 A1 * | 9/2010 | Kajigai | B60W 40/072 701/31.4 |
| 2013/0091959 A1 * | 4/2013 | Lee | G01L 3/1435 29/428 |
| 2017/0122821 A1 * | 5/2017 | Pietron | B60K 17/344 |

* cited by examiner

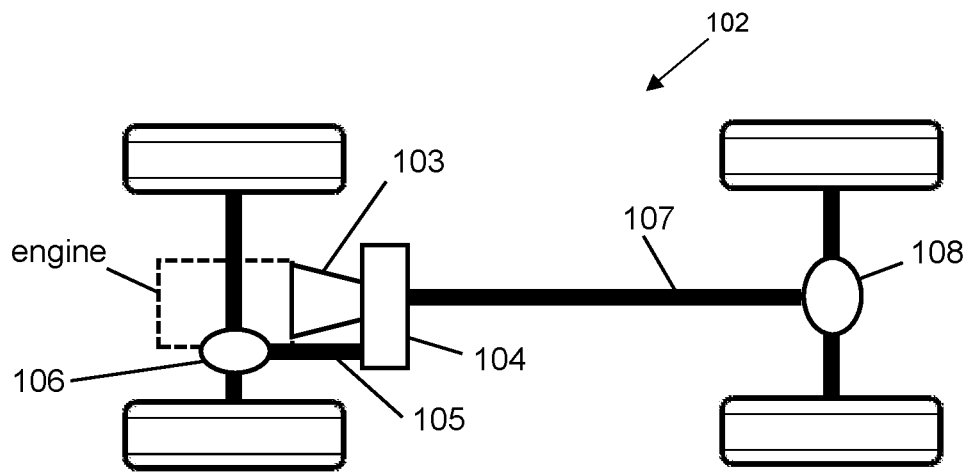
FIG. 1 – PRIOR ART
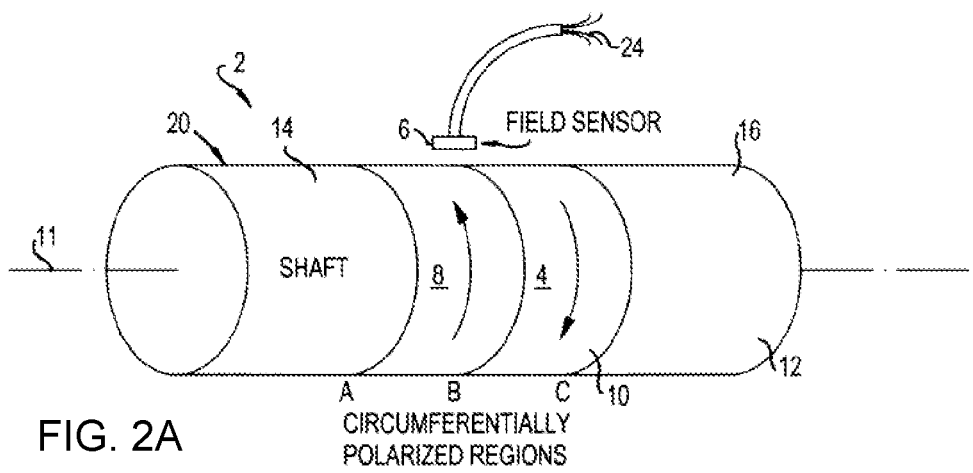
FIG. 2A
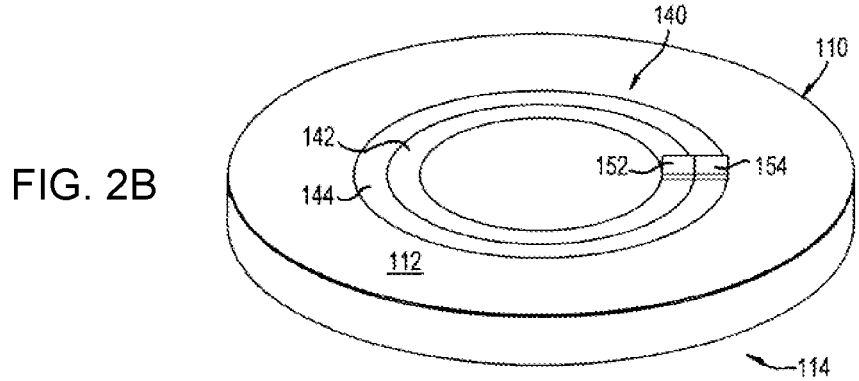
FIG. 2B

DIFFERENTIAL TRANSFER CASE TORQUE SENSOR APPARATUS AND METHOD

CROSS REFERENCE TO RELATED APPLICATIONS

This application is based on and claims the benefit of the respective filing dates and disclosures of U.S. Provisional Patent Application No. 62/990,270, filed Mar. 16, 2020, and U.S. Provisional Patent Application No. 62/964,946, filed Jan. 23, 2020, both entitled "Differential Transfer Case Torque Sensor Apparatus and Method," the contents of which are incorporated by reference herein in their entirety.

BACKGROUND OF THE INVENTION

Field of the Invention

The present invention relates to methods and sensing devices for automotive transmissions and, more particularly, to non-contacting magnetoelastic torque sensing technology and devices for providing a measure of the torque transmitted by transmission components for use in dynamically determining various vehicle characteristics.

Description of Related Art

Often, sensors are arranged on a vehicle for directly or indirectly measuring operating characteristics of the vehicle. For example, vehicle wheel slip (relative to a road or other surface) is a useful operating parameter for understanding the physical dynamics of a vehicle's movements (i.e., vehicle stability). Vehicle weight is another useful operating parameter for understanding the physical dynamics of a vehicle's movements and for assessing the amount of the vehicle's tailpipe emissions.

Accurately determining wheel slip, vehicle weight, and many other vehicle characteristics is useful to both designers and regulators, but may also be useful to vehicle operators that need to understand performance, maintenance needs, functions, and uses of their vehicle at any given time.

Monitoring of vehicle characteristics may be driven in part by manufacturer technical specifications (nominal and/or prescribed ranges) and third party technical standards. For example, accurately assessing vehicle operating characteristics may be useful in complying with predictive maintenance schedules adopted by a vehicle manufacturer to ensure a vehicle is maintained at proper intervals and determining when a function of the vehicle deviates from nominal or prescribed ranges. Monitoring vehicle operating characteristics may also be useful in complying with stringent vehicle fuel economy and efficiency standards, which have been adopted around the world and are being phased in as a result of new regulations passed by governments focused on reducing carbon dioxide and other emissions for health and environmental purposes.

In some cases, regulations may impose standards that differ based on the type and use of vehicles and the fuel used by the vehicles. For example, commercial trucks above a certain gross weight that combust diesel fuel may be required to meet standards and maintenance schedules that are different than private gasoline-based passenger vehicles. It is important, therefore, to understand the dynamic characteristics and changes in characteristics of a vehicle.

In some cases, it may not be feasible to directly measure vehicle characteristics, and thus indirect measurements are needed. Consider, for example, a process for assessing vehicle weight. The prior art describes various approaches to measuring vehicle weight (gross vehicle weight or sprung weight) and other operating characteristics. One method for indirectly determining a weight of a vehicle during operation is to use metrics related to engine power output, speed of the vehicle, forces acting on the vehicle (e.g., rolling resistance, drag, others), and power transfer efficiencies, among others. Those metrics may be used to calculate the weight (with the help of a suitable algorithm). The calculations may take into account the amount of input force (torque) applied by a vehicle's engine to its transmission drive shaft, the speed (revolutions per minute) of the engine and transmission shaft, transmission shaft weight, wheel size, wheel speed, acceleration of the vehicle, and many other parameters.

Often, the above and other vehicle parameters related to vehicle operating characteristics are measured without the feedback from secondary sensors that directly measure power transferred to drive wheels and that would provide either input to an algorithm for directly calculating a parameter or indirect feedback to verify other direct measurements of a parameter by other sensors.

Moreover, vehicle operating characteristics are often measure after an inertial action of a member is detected at a first time, such as an actual wheel rotation, to provide feedback for controlling that action at a second time. It would be helpful, in terms of better understanding the vehicle characteristics and controlling the action, if certain forces that contribute to the changes in inertia were detected prior to the inertial action.

Increasingly, magnetoelastic-based torque sensor devices have been used in vehicles for measuring torque-dependent operating characteristics, including torque applied to power drivetrain components, some of which are shown schematically in FIG. 1, which depicts a top view of drive train and differential components 102 of a vehicle. The components include, for a front- and/or rear-wheel drive vehicle, a transmission 103, a transfer case 104, a front power transmission drive shaft 105, a front differential 106, a left-front half-shaft axle, a right-front half-shaft axle, a rear power transmission drive shaft 107, a rear differential 108, and, depending on the vehicle, a left-rear half-shaft axle, a right-rear half-shaft axle, a left-front half-shaft axle, and a right-front half shaft axle.

Referring to FIG. 2A from U.S. Pat. No. 6,260,423, which is incorporated herein by reference, shown therein is a shaft-type torque sensor device 2, which includes a transducer 4 and a magnetic field vector sensor 6. The transducer 4 includes one or more axially distinct, magnetically contiguous, oppositely polarized, circumferential bands or regions 8, 10 solely defining the magnetically active or transducer region of the shaft 12. The region 14 of the shaft to the left of A and the region 16 to the right of B are distinguishable from the active region only by the absence of any significant remanent magnetization. The shaft 12 is typically formed of a ferromagnetic, magnetostrictive material having a particularly desirable crystalline structure such that the active region will, likewise, be formed of ferromagnetic, magnetostrictive material having the desired crystalline structure. A torque 20 is shown being applied at one portion of the shaft 12 and is transmitted thereby to another portions of the shaft 12 where the motion of the shaft 12 due to the torque 20 performs some useful work. The torque 20 is shown as being in a clockwise direction looking at the visible end of the shaft 12, but obviously can be applied to rotate or tend to rotate the shaft in either or both directions depending on the nature of the machine incorporating the shaft 12.

The transducer 4 is magnetically polarized in a substantially purely circumferential direction, as taught in U.S. Pat. Nos. 5,351,555 and 5,520,059, the contents and disclosures of which are incorporated herein by reference, at least to the extent that, in the absence of the torque 20 (in a quiescent state), it has no net magnetization component in the direction of axis 11 and has no net radial magnetization components. The closed cylindrical shape of the transducer 4 enhances the stability of the polarization by providing a complete magnetic circuit.

The magnetic field vector sensor 6 is a magnetic field vector sensing device located and oriented relative to the transducer 4 so as to sense the magnitude and polarity of the field arising in the space about the transducer 4 as a result of the reorientation of the polarized magnetization from the quiescent circumferential direction to a more or less steep helical direction upon application of the torque 20. The magnetic field vector sensor 6 provides a signal output reflecting the magnitude of the torque 20. The magnetic field vector sensor 6 may be an integrated circuit Hall effect sensor. The wires 24 connect magnetic field vector sensor 6 to a source of electrical current, and transmit the signal output of the magnetic field vector sensor 6 to a receiving device (not shown), such as a control or monitoring circuit for the machine or system incorporating the shaft 12. A more detailed discussion of the types, characteristics, positioning and functioning of magnetic field vector sensors appears in at least the aforementioned U.S. Pat. Nos. 5,351,555 and 5,520,059; as well as in at least the aforementioned U.S. Pat. No. 8,087,304.

The two circumferentially polarized regions 8, 10 together constitute the transducer's active region 4. The field sensor shown is centered on the "wall" between the two oppositely polarized regions and is oriented to sense the radial field at this location. One or more magnetic field sensors may be utilized. In general, each such sensor would be located near the active region and oriented such that it is maximally efficient at sensing the field that arises when the shaft is transmitting torque. The similarity between this transducer and the more conventional design of U.S. Pat. Nos. 5,351,555 and 5,520,059 employing an active region endowed with uniaxial circumferential anisotropy ("ring sensor") is obvious.

Referring to FIG. 2B from U.S. Pat. No. 8,836,458, which is incorporated herein by reference, shown therein is a perspective drawing of a generally disk-shaped torque sensor device. The disk 110 is formed of ferromagnetic material and is, or at least includes, a magnetoelastically active region 140. The material selected for forming the disk 110 must be at least ferromagnetic to ensure the existence of magnetic domains for at least forming a remanent magnetization in the magnetoelastically active region 140, and must be magnetostrictive such that the orientation of magnetic field lines in the magnetoelastically active region 140 may be altered by the stresses associated with applied torque. The disk 110 may be completely solid, or may be partially hollow. The disk 110 may be formed of a homogeneous material or may be formed of a mixture of materials. The disk 110 may be of any thickness, and is preferably between about 3 mm and about 1 cm thick.

The magnetoelastically active region 140 is preferably flat, and comprises at least two radially distinct, annular, oppositely polarized magnetically conditioned regions 142, 144, defining the magnetoelastically active region 140 of the torque sensing device. The top and bottom surfaces 112, 114 do not have to be flat, however, as shown, but could have variable thickness in cross-section from the center of the disk 110 to the outer edge. Depending on the application for which the torque sensing device is desired, it may be impractical to position magnetic field sensors 152, 154 on both sides of the disk 110. Therefore, the magnetoelastically active region 140 may be present on only one surface of the disk 110. However, the magnetoelastically active region 140 may also be present on both sides of the disk 110. One or more magnetic field vector sensors may be positioned in proximity to the magnetically conditioned regions.

What is needed is an accurate method for directly and/or indirectly measuring and determining various vehicle operating characteristics and conditions using multiple magnetoelastic-type torque sensors placed in selected useful locations to provide useful feedback information, such as information about vehicle operating characteristics and conditions, like weight, wheel slip, transmission shifting, and others, and in particular sensor feedback information about conditions just prior to a change in the state of the vehicle caused by a torque or other force, rather than relying only on sensor feedback after an inertial action has occurred.

BRIEF SUMMARY OF THE INVENTION

In one aspect, a torque sensing device having non-contacting magnetic field sensors positioned proximate to a shaft-like member, such as a power transmission shaft or axle, may be used to measure the torque transmitted between ends of the shaft and for obtaining an accurate assessment of the amount of torque applied to the transmission drive shaft and to the left and right half-shafts connected to the drive wheels. With an understanding of torque at those and other locations on the vehicle, vehicle operating characteristics may be determined either directly or through feedback to improve on-board calculations and thus the operation, drivability, and performance of the vehicle, as well as better predict when routine, preventative, and other maintenance should be performed.

In general, torque sensors include a torque-carrying member, axially distinct bands within or integral to the member that have been magnetically treated, and a magnetic flux sensing device for detecting, without contacting the torqued member, differences in the response of the bands to forces applied to the torque-carrying member.

Upon the application of torsional stress to the shaft, the magnetization in the bands reorients and becomes increasingly helical as torsional stress increases. The helical magnetization resulting from torsion has both a radial component and an axial component, the magnitude of the axial component depending entirely on the degree of torsion.

In another aspect, a torque sensor device involves a torque sensing device having magnetic field sensors that output a signal representative of an applied torque, wherein the output signal varies with respect to variations in the applied torque.

A torque sensor device construction involves use of "collarless" transducers, where the magnetoelastically active region is integral to the shaft and is polarized in a circumferential direction and itself possesses sufficient magnetic anisotropy to return the magnetization in the region, following the application of torque to the member, to the circumferential direction when the applied torque is reduced to zero. In some configurations, a magnetoelastically active region may be divided into dual circumferentially and oppositely polarized regions axially spaced-apart on the shaft, with sensors positioned in proximity to each of the regions with their sensitive directions oriented axially and oppositely to each other to permit common mode field cancellation. In another configuration, it may be useful to divide up the magnetoelastically active region into three or more regions, each with alternating opposite polarization, with at least one sensor for each region.

A disk-shaped member may also be treated to include a magnetoelastically active region that is polarized in a circumferential direction. In such a configuration, a magnetic field sensor may be mounted proximate to the active region, the sensor sensing the magnitude of a magnetic field resulting from a torque transferred from a shaft to the disk-shaped member, and the sensor outputting a signal in response thereto. In some such configurations, a disk having dual circumferentially and oppositely polarized regions may be used, with two sensors positioned along the same radial line, their sensitive directions oriented axially and oppositely to permit common mode field cancellation. In another configuration, it may be useful to use three regions, or circular bands, each with alternating opposite polarization, with at least one sensor for each band.

Various improvements in torque sensors have been developed over time to address things like noise, near field sources, compassing due to ambient magnetic fields, parasitic fields, and non-zero RSU signals. Magnetic fields of external origin can emanate from both far field and near field sources. A far field source, such as the earth's magnetic field, generally has the same effect on each magnetic field sensor in a torque sensing device having multiple magnetic field sensors. Near field sources, such as permanent magnets, magnetized wrenches, motors, solenoids, etc., may create magnetic fields having significant local gradients, and thus have significantly different effects on the different magnetic field sensors in a torque sensing device that has multiple magnetic field sensors.

Compassing may be address by using two axially-distinct magnetoelastically active regions, polarized in opposite circumferential directions, with magnetic field sensors having opposite axial polarities positioned proximate to the active regions and providing output signals in response to a torque applied to the shaft. By summing the outputs of the magnetic field sensors, all common mode external magnetic fields, i.e. far fields, are canceled. In applications employing such a scheme, the oppositely polarized sensors should be placed as close to each other as possible to preserve the efficiency of the common mode rejection scheme. Sensors that are spaced from one another exhibit reduced common mode rejection efficiency, as the earth's magnetic field may be significantly distorted around ferromagnetic parts in and around the torque sensor.

To cancel near field magnetic noise from external sources without canceling a torque-induced magnetic field, a torque sensor may include three sets of magnetic field sensors, axially spaced proximate to a shaft, the shaft having a magnetoelastically active region that is polarized in a circumferential direction. Signals received by each of the magnetic field sensors are adjusted to compensate for the effects of near field sources.

In another aspect, a torque sensor device of the kind described above involves a torque sensing device having magnetic field sensors placed in pairs, with the magnetic field sensors having their sensing directions opposite one another, to minimize the detrimental effects of magnetic noise, including compassing.

In another aspect, the torque sensing device has multiple, spaced-apart magnetic field sensors that are specially positioned to enhance the performance of the torque sensing device.

In yet another aspect, the torque sensor may be configured such that the magnetoelastically active region of a shaft-like member of a torque sensor device is both ferromagnetic and magnetorestrictive, wherein the magnetoelastically active region produce a magnetic field that varies with a torque applied to the shaft member, and wherein the magnetically active region possesses sufficient magnetic anisotropy to return the magnetization in the magnetoelastically active region to an initial state when the torque applied to the shaft member is reduced to zero In another configuration, at least one pair of magnetic field sensors are disposed adjacent to one another and proximate to the magnetoelastically active region, wherein their sensitive directions of the magnetic field sensors may be opposite one another and perpendicular to the direction of polarization of the first and second magnetically conditioned regions such that the magnetic field sensors provide an output signal that is representative of the torque applied to the shaft member.

In still another configuration, the magnetically conditioned regions of the torque sensor device may be part of the shaft-like member, and the individual regions or bands thus conditioned may not have a gap therebetween, which may increase the accuracy of the torque sensing device.

Also, multiple pairs of magnetic field sensors may be used at a particular sensing location to increase accuracy of the output signal used for determining (calculating) torque.

In another aspect, the magnetoelastically active region may be magnetized in an axial direction rather than in a circumferential direction. Furthermore, the magnetic field sensors may thus be circumferentially oriented when the magnetoelastically active region, or the individual magnetically conditioned regions or bands that make up the mangetoelastically active region, are axially polarized, and axially oriented when the magnetically conditioned regions are circumferentially polarized, to enhance the performance of the device and to increase accuracy.

In another aspect, a torque sensor device of the kind described above and it variants may be employed in connection with a power transmission drive shaft of a vehicle and used to output a signal representative of the actual torque applied to/transmitted by the shaft at the location where the magnetic field sensors are positioned.

Moreover, a torque sensor device may be employed in connection with a left half-shaft rear axle and a different torque sensor device may be used in connection with a right half-shaft rear axle of a vehicle, each used to output a signal representative of the actual torque applied to/transmitted by the half-shaft at the location where the magnetic field sensors are positioned for use as an input to an algorithm that estimates parameters associated with a drivetrain to improve operation of the drivetrain and the vehicle of which it is a part.

In general, the torque outputted to each of the half-shafts at a differential is equal to the torque inputted to the differential as shown in equation (1):

$$T(\text{left})+T(\text{right})=T(\text{input}) \qquad (1)$$

Here, the inputted torque, T(input), may be the torque measured by one or more torque sensors that have been adapted to the power transmission shaft, for example, at a location where the end of the power transmission shaft is closest to a rear differential, at a location where the other end of the power transmission shaft is closest to a transfer case or the engine or motor, or at a location in between the two ends of the power transmission shaft.

In some cases, calculating torque at the drive wheels or at other locations may be done by assuming certain losses or efficiencies between a point where power is generated (i.e., the output from the engine/motor) and a point where the power is applied (e.g., at a drive wheel or some intermediate point), in the absence of actual data that describes the actual losses or efficiencies. One or more torque sensors of the kind described herein positioned between the point where the power is generated and the point where the power is applied may provide a more accurate assessment of the losses and efficiencies of the power transmission system, and therefore better management of the vehicle.

In another aspect, a system-level output signal from multiple toque sensor devices positioned at different locations in a vehicle may be used as input to algorithms for calculating one or more operating conditions of the vehicle, including but not limited to calculating the gross weight of the vehicle. Weight may be estimated from, among other parameters, a grade angle where the vehicle is located, a wheel torque on the grade angle, a drive wheel rolling radius, a gravity constant, and a road load torque measured at the drive wheel. A vehicle's mass may include the mass of the vehicle, the added mass of passengers, and the mass of a trailer coupled to the vehicle. Knowing a vehicle's overall mass at any given point in time and under different conditions may be important for several reasons, including for precisely managing the engine's or motor's power output.

Other uses of the signals from the torque sensor devices include estimating friction at the wheels (i.e., micro-slippage); providing inputs to traction control, braking, and transmission shifting systems; monitoring vehicle dynamics such as the amount of torque distribution to the right, left, front, and rear wheels in four-wheel drive systems; providing inputs to overload protection systems, predictive maintenance monitoring algorithms, warranty claim protection analysis (e.g., monitoring for engine tune-ups); and providing data to hybrid drive torque management systems, among other uses.

With those and other aspect, objects, advantages, and features of the invention that may become hereinafter apparent, the nature of the invention may be more clearly understood by reference to the following detailed description of the invention, the appended claims and to the several drawings attached herein.

BRIEF DESCRIPTION OF THE DRAWINGS

FIG. 1 is a schematic, top view of drive train and differential components for use in a vehicle.

FIG. 2A is a schematic perspective view of a prior art shaft-type torque sensor system component:

FIG. 2B is a schematic perspective view of a prior art disk-type torque sensor system component:

DETAILED DESCRIPTION OF THE INVENTION

Figure 3A:
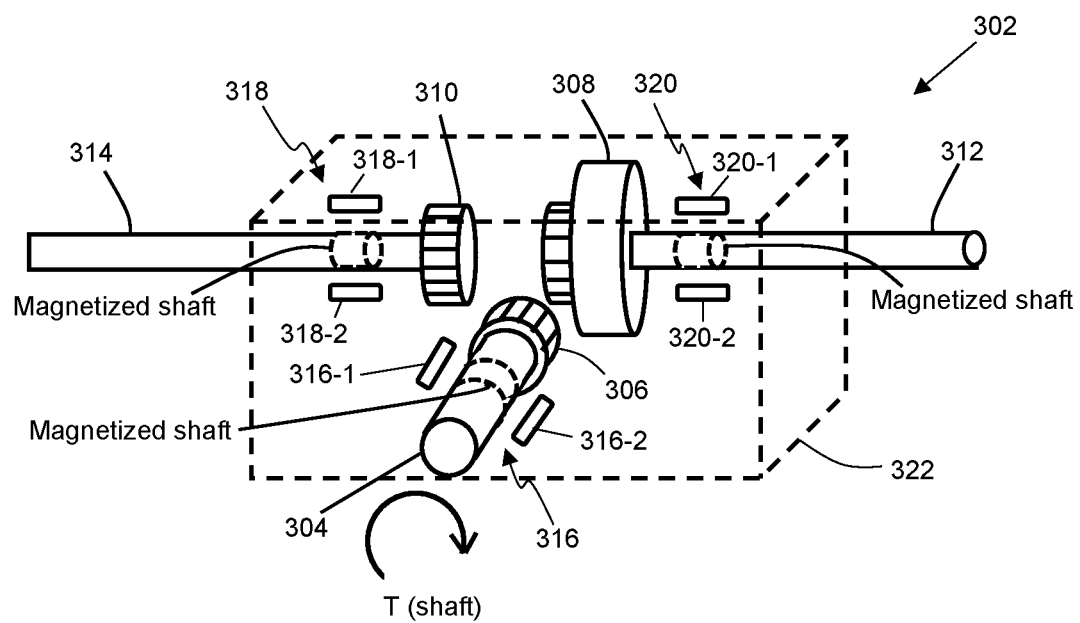
FIGS. 3A and 3B are schematic, perspective views of mechanical components of a rear differential for use in a vehicle.

Several preferred embodiments of the invention are described for illustrative purposes, it being understood that the invention may be embodied in other forms not specifically shown in the drawings. The figures herein are provided for exemplary purposes and are not drawn to scale.

Apparatus

Turning now to FIG. 3A, shown therein is a schematic, perspective view drawing of some of the mechanical components of a rear differential apparatus 302 for use in a vehicle (not shown). The arrangement of components of the rear differential apparatus 302 generally also applies to a front differential apparatus in a vehicle adapted for all-wheel drive. As shown, the rear differential apparatus 302 includes all or a portion of a power transmission shaft 304, which includes a drive pinion gear 306: a crown gear wheel 308: a bevel gear 310, portions of a left rear half-shaft axle 312, and portions of a right rear half-shaft axle 314.

The power transmission shaft 304 is a shaft having a length and diameter and made from a material or materials suitable for a particular vehicle application. It may be formed of a homogeneous material or may be formed of a mixture of materials. The power transmission shaft 304 may be completely solid, or may be partially hollow. The power transmission shaft 304 is used to transfer power generated by the vehicle's engine or motor (not shown) to other components of the rear differential apparatus 302, by applying torque, T(shaft) to the shaft 304 at its proximate end (the end closest to the power source). That torque is then conveyed along the shaft to its distal end shown in the figure.

The pinion gear 306 is locate at the distal end of the power transmission shaft 304 and is used to engage with the crown gear wheel 308. The crown gear wheel 308 is connected to one end of the left rear half-shaft axle 312. The other end (not shown) of the left rear half-shaft axle 312 is mechanically operatively connected (e.g., bolted, welded, screwed, adhered, pinned, or other means) to its corresponding wheel (also not shown), which in this case is the left rear wheel of the vehicle.

The crown gear wheel 308 may be completely solid, or it may be partially hollow. The crown gear wheel 308 may be formed of a homogeneous material or may be formed of a mixture of materials. The crown gear wheel 308 engages with the bevel gear 310.

The bevel gear 310 is mechanically operatively connected to one end of the right rear half-shaft axle 314. The other end of the right rear half-shaft axle 314 is mechanically operatively connected to its corresponding wheel (not shown), which is this case is the right rear wheel of the vehicle.

A shaft-type primary non-contact torque sensor 316, having one or more of the features and aspects described above, suitably modified for a particular application, may be used. Specifically, the torque sensor 316 may include a transducer portion having one or more axially distinct, magnetically contiguous, oppositely circumferentially polarized bands or regions 8, 10 solely defining the magnetically active or transducer region of the shafts, along with one or more magnetic field vector sensors (shown in FIG. 2A, as a non-limiting example).

The torque sensor 316 may be positioned at the distal end of the power transmission shaft 304 close to the pinion gear 306, as approximately shown, or at other locations closer or farther away than the location shown. Additional, similar (or structurally different but functionally the same) primary non-contact torque sensors 318, 320 may be positioned on the right rear and left rear half-shaft axles 312, 314, respectively, approximately where shown, or at other locations on the half-shafts. In some instances, only the torque sensor 316 may be part of the rear differential apparatus 302. In other instances, only the torque sensors 318, 320 may be part of the rear differential apparatus 302. In some cases, all three may be included, but only the torque sensor 316, or the torque sensors 318, 320, may be operational in ordinary use of the rear differential apparatus 302.

In the configuration shown, a torque applied to the power transmission shaft 304 may be split and converted into an applied torque on the left- and right rear half-shaft axles 312, 314, which are mechanically operatively connected to the left and right rear wheels. The torque outputted to each of the half-shaft axles 312, 314 may be related to the torque inputted to the differential using the following general relationship:

$$T316=1/\varepsilon_d \times (T318+T320) \quad (2)$$

Here, T316 is the measured applied torque provided by the power transmission shaft 304 at the location of the torque sensor 316, T318 is the measured applied torque on the right rear half-shaft axle 314 at the location of the torque sensor 318, T320 is the measured applied torque on the left rear half-shaft axle 312 at the location of the torque sensor 320, and $\varepsilon_d$ represents mechanical inefficiencies at the differential (which may include thermal changes due to material interactions between gears, deformation, slippage, and other losses).

All or some of the torque sensors shown may be located within or outside of a differential housing 322 (represented schematically as a box in FIG. 3A). Additional torque sensors could also be positioned at locations closer to the wheels and at other locations along the power transmission shaft 304 as needed to improve the ability to accurately measure and assess torque at the wheels and other locations without the need to resort to estimations of efficiency and other factors related to the delivery of power (produced by the vehicle's motor or engine) to the drive wheels.

The magnetoelastically active region of each of the torque sensors 316, 318, 320 may include one or more magnetically conditioned bands or regions 8, 10 formed by magnetically conditioning a contiguous, axial-extending portions of the power transmission shaft 304, the left rear half-shaft axle 312, and/or the right rear half-shaft axle 314, approximately where shown. The actual placement of the magnetically conditioned bands or regions 8, 10 may be determined by physical space, temperature, environment, and other considerations. The conditioned bands or regions 8, 10 may be formed prior to the shafts being installed in the vehicle by, for example, subjecting the portions to a strong permanent magnet oriented in such a way as to endow the portions with a magnetization in a generally circumferential direction or in alternating different circumferential directions (as best seen in FIG. 2A, regions 8, 10). One, two, three, or more such conditioned regions may be included as part of the magnetoelastically active transducer portions of the shafts. In some applications, these regions may be formed of a polycrystalline material. In one aspect, the portions of the shafts magnetically endowed may be of a polycrystalline material having cubic symmetry and sufficient coercivity (e.g., greater than 15 Oersted (Oe)), generally exhibiting randomly-oriented dipoles prior to magnetization.

Each of the torque sensors 316, 318, 320 may have one or more magnetic field vector sensors. For example, the torque sensor 316 may be equipped with magnetic field sensors 316-1 and 316-2 arranged circumferentially at the same axial location on the power transmission shaft 304 where it has been magnetically conditioned, each sensor separated by a 180-degree azimuth angle (i.e., on opposite sides of the power transmission shaft 304 at the magnetically conditioned band or region 8). Additional magnetic field sensors 316-3, 316-4, etc. (not shown) may also be used at the same axial location, each sensor separated by an equal azimuth angle (e.g., 90-degrees, in the case of four magnetic field sensors). Still more magnetic field sensors may be positioned at a different axial position corresponding to a different conditioned band or region 10 of the magnetoelastically active region of the shaft, each one arranged circumferentially and separated by a specific azimuth angle.

Similarly, the torque sensor 318 arranged on the right rear half-shaft 314 may be equipped with magnetic field sensors 318-1 and 318-2 arranged circumferentially at the same axial location on the right rear half-shaft 314 where the shaft has been magnetically conditioned, each sensor separated by a 180-degree azimuth angle. Additional magnetic field sensors 318-3, 318-4, etc. (not shown) may also be used, each sensor separated by an equal azimuth angle (e.g., 90-degrees, in the case of four magnetic field sensors). More magnetic field sensors may be positioned at a different axial position corresponding to magnetically conditioned band or region 10 of the magnetoelastically active region of the right rear half-shaft 314, each sensor also arranged circumferentially and separated by a specific azimuth angle.

Similarly, the torque sensor 320 may also be equipped with magnetic field sensors 320-1 and 320-2 arranged circumferentially at the same axial location on the left rear half-shaft 312 where the shaft has been magnetically conditioned, each sensor separated by a 180-degree azimuth angle. Additional magnetic field sensors 320-3, 320-4, etc. (not shown) may also be used, each sensor separated by an equal azimuth angle (e.g., 90-degrees, in the case of four magnetic field sensors). More magnetic field sensors may be positioned at a different axial position corresponding to magnetically conditioned band or region 10 of the magnetoelastically active region of the left rear half-shaft 312, each sensor also arranged circumferentially and separated by a specific azimuth angle.

Each magnetic field sensor is arranged so as to sense the magnitude and polarity of the magnetic field arising from the magnetically conditioned bands or regions 8, 10 in the space about the transducer as a result of the reorientation of the polarized magnetization from the quiescent circumferential direction to a more or less steep helical direction upon application of a torque. The magnetic field sensors provide a signal output reflecting the magnitude of the torque.

Each of the magnetic field sensors may be an integrated circuit Hall effect sensor. Each magnetic field sensor may be connected by a electrical lead or wire 24 (as shown in FIG. 2A) to a source of electrical current (for providing voltage to the magnetic field sensor components), and may transmit the signal output of the magnetic field sensor to a receiving device (not shown), such as an electronic control unit, which may include a monitoring circuit, a signal conditioning circuit, an amplification circuit, or another circuit.

In addition to the primary magnetic field sensors 316, 318, 320, one or more secondary magnetic field sensors (not shown) may be used to assess the effects of a near- or far-field source on the output signals from the torque sensors 316, 318, 320. For example, one or more secondary magnetic field sensors may be located axially distant from the left and right boundaries of each of respective magnetoelastically active regions so as to detect the presence of near- and far-field sources at the locations of the torque sensors 316, 318, 320.

Non-contact torque sensors of the magnetoelastic and magnetostrictive type as shown for use with rotating shafts or disk-shaped members are available from Methode Electronics, Inc. (Chicago, Illinois) and are depicted and described in the following: U.S. Pat. Nos. 4,896,544, 5,351, 555, 5,520,059, 6,047,605, 6,145,387, 6,260,423, and 6,553, 847 to Garshelis (among others): U.S. Pat. No. 6,513,395 to Jones: U.S. Pat. No. 8,779,306 to Lee; and U.S. Pat. Nos. 9,151,686, 9,683,906, 10,488,278, and 10,151,652 to Gießibl (among others), all of which are incorporated by reference herein in their entirety.

Figure 3B:
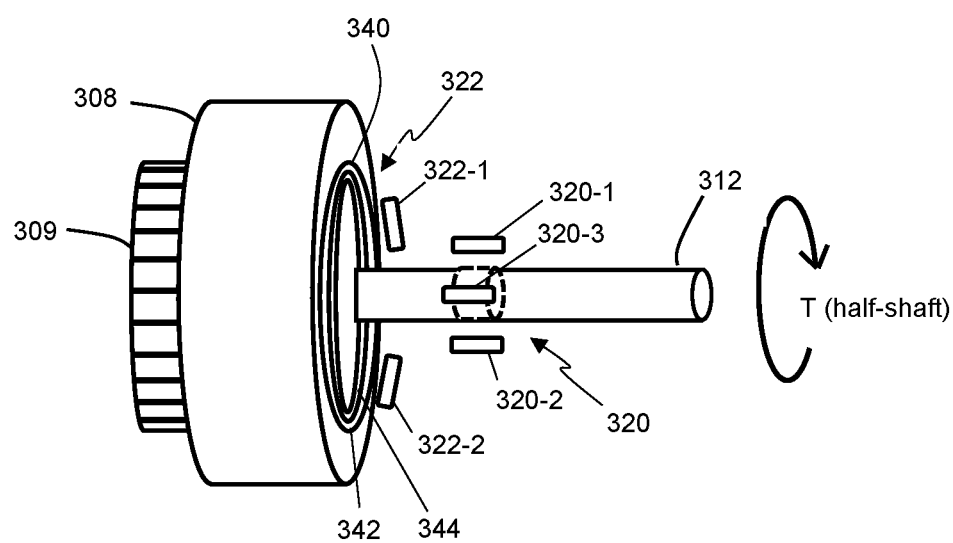

In another exemplary configuration, shown in FIG. 3B, the crown gear wheel 308 may include a disk-type primary non-contact torque sensor 322, having one or more of the features and aspects described above in connection with FIG. 2B. Specifically, the torque sensor 322 may include a magnetoelastically active region 340 that is magnetostrictive such that the orientation of magnetic field lines in the magnetoelastically active region 340 may be altered by the stresses associated with applied torque (e.g., a torque applied due to the engagement of the pinion gear 306 portion of the power transmission shaft 304 and the gear portion 309 of the crown gear wheel 308).

The magnetoelastically active region 340 may be flat (or have the same contour as the portion of the crown gear when 308 to which it is a part), and comprises at least two radially distinct, annular, oppositely polarized magnetically conditioned bands or regions 342, 344, defining the magnetoelastically active region 340 of the torque sensor 322. The bands or regions 342, 344 may be of variable thickness in cross-section from the center of the crown gear wheel 308 to its outer edge, and variable width in the radial direction.

The torque sensor 322 may have one or more magnetic field vector sensors. For example, the torque sensor 322 may be equipped with magnetic field sensors 322-1 and 322-2 arranged circumferentially at the same radial distance from the axis of rotation of the crown gear wheel and above the surface of the conditioned band or region 342 on the crown gear wheel 308 where it has been magnetically conditioned, each magnetic field sensor separated by a specific azimuth angle. Additional magnetic field sensors may also be used at the same radial location, each sensor separated by an equal azimuth angle (e.g., 90-degrees, in the case of four magnetic field sensors). Still more magnetic field sensors may be positioned at a different axial position corresponding to the other conditioned band or region 344 of the magnetoelastically active region 340, each one arranged circumferentially and separated by a specific azimuth angle.

In some instances, only the torque sensor 322 may be part of the rear differential apparatus 302. In other instances, some or all of the torque sensors 316, 318, 320 may also be part of the rear differential apparatus 302. In some cases, different combinations of the four torque sensors may be included, and only some may be operational in ordinary use of the rear differential apparatus 302.

Figure 4:
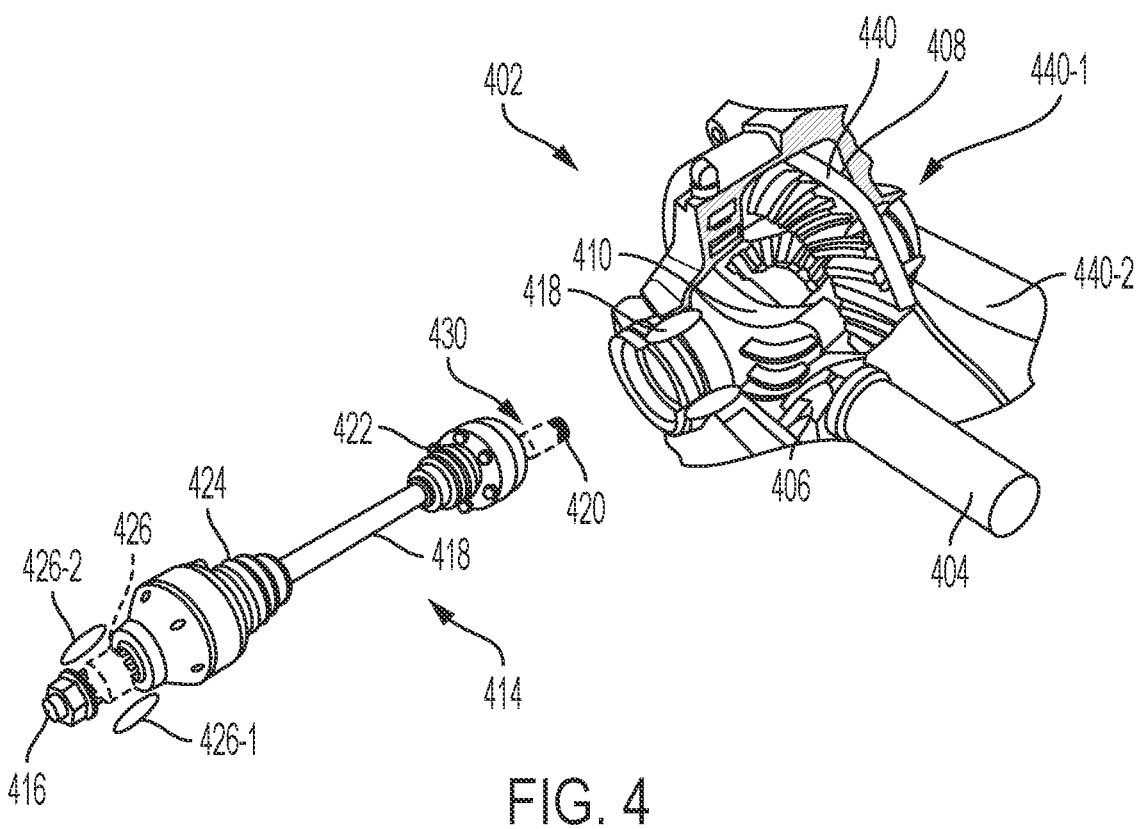
FIG. 4 is a partial schematic of a torque sensor device in connection with a left-rear half-shaft axle and portions of a rear differential for a vehicle.

Turning to FIG. 4, shown therein is a partial schematic diagram of multiple torque sensor devices used in connection with a rear differential apparatus 402 for a vehicle. Similar to the arrangement described above in FIG. 3A, the rear differential apparatus 402 encompasses a portion of a power transmission shaft 404, which includes a drive pinion gear 406 at its distal end: a crown gear wheel 408: a bevel gear 410: a connecting end portion of a left rear half-shaft axle (not shown); and a connecting end portion of a right rear half-shaft axle 414.

The right rear half-shaft axle 414 consists of a wheel hub connecting end 416, a shaft 418, a rear differential connecting end 420, and inner and outer constant velocity (CV) joints 422, 424. As shown, the hub end portion of the axle 416 may include a torque sensor 426, and the differential end portion of the axle 420 may include a torque sensor 430. In some instances, both torque sensors 426, 430 may be included with the right rear half-shaft axle 414, and one or both may be made operational during normal use.

Each of the torque sensors 426, 430 may be endowed with magnetically conditioned regions of the type described above, each having one, two, three, or more magnetically conditioned bands or regions (not shown) that exhibit an external field arising, as a result of the applied torque to the right rear half-shaft axle 414, in the space above the magnetically conditioned bands or regions.

Each of the torque sensors 426, 430 may include one or more magnetic field vector sensors as generally shown and described above to sense the magnitude and polarity of the aforementioned external field and provide a signal output reflecting the magnitude and direction of the applied torque. Magnetic field sensors may include a pair of oppositely connected sensing coils for measuring a difference signal resulting from the external magnetic fluxes of the polarized bands of the magnetically conditioned bands or regions.

For example, the torque sensor 426 may be equipped with magnetic field sensors 426-1 and 426-2 arranged circumferentially at the same radial distance from the axis of rotation of the wheel hub connecting end 416 and above the surface of the magnetically conditioned band or region of the wheel hub connecting end 416 where it has been magnetically conditioned. Each magnetic field sensor 426-1, 426-2 may be separated by a specific azimuth angle, such as 180-degrees. Additional magnetic field sensors may also be used at the same radial location, each sensor separated by an equal azimuth angle (e.g., 90-degrees, in the case of four magnetic field sensors). Still more magnetic field sensors may be positioned at a different axial position corresponding to the other conditioned bands or regions of the magnetoelastically active region, each one arranged circumferentially and separated by a specific azimuth angle.

Similarly, the torque sensor 430 may be equipped with magnetic field sensors arranged circumferentially at the same radial distance from the axis of rotation of the rear differential connecting end 420 and above the surface of the magnetically conditioned band or region of the rear differential connecting end 420 where it has been magnetically conditioned. Each magnetic field sensor (not shown) may be separated by a specific azimuth angle, such as 90-degrees (in the case of four magnetic field sensors) or 180-degrees (in the case of two magnetic field sensors). Still more magnetic field sensors may be positioned at a different axial position corresponding to the other conditioned bands or regions of the magnetoelastically active region, each one arranged circumferentially and separated by a specific azimuth angle.

In the configuration shown, the torque provided by the power transmission shaft 304 will be transferred in part and applied to the rear differential connecting end 420 of the right rear half-shaft axle 414, which will be applied to the inner CV joint 422, then to the shaft 418, then to the outer CV joint 424, and finally to the wheel hub connecting end 416 (and finally to the right rear wheel). The torque measured by the torque sensors 426, 430 may be related as shown generally below, taking into account losses including mechanical inefficiencies at the CV joints ($\varepsilon_{cv}$):

$$T430 = f \times T316 \tag{3}$$

$$T426 = 1/\varepsilon_{cv} \times T430 \tag{4}$$

Here, T316 is the measured applied torque provided by the power transmission shaft 304 at the location of the torque sensor 316 (see FIG. 3A), T430 is the measured applied torque on the rear differential connecting end 420 at the location of the torque sensor 430, f is the fraction of torque transferred to the right rear half-shaft 414 at the differential (e.g., 0) % to 100%), T426 is the measured applied torque on the wheel hub connecting end 416 at the location of the torque sensor 426, and $\varepsilon_{cv}$ represents mechanical inefficiencies at the CV joints (which may include thermal changes due to material interactions, deformation, slippage, and other).

In another aspect, the crown gear wheel 408 may be endowed on its outer peripheral surface with a magnetically conditioned region 440, which may consist of one or more bands or regions that have been polarized in generally alternating circumferential directions. Corresponding non-contact magnetic field vector sensors 440-1, 440-2 ... 440-n (where 440-n represents the n-th desired number of magnetic field sensors) may be positioned around the magnetically conditioned region 440 at various substantially equal azimuth angles near each of the polarized bands or regions in a manner similar to that as described above.

Figure 5:
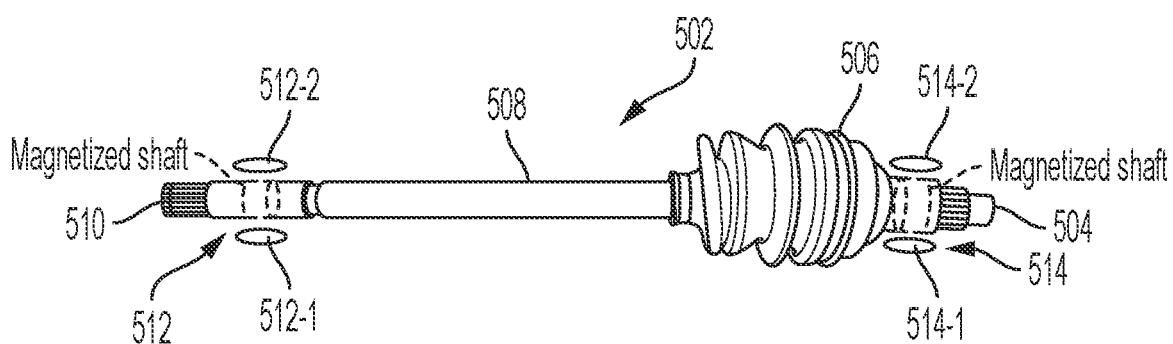
FIG. 5 is a schematic of a torque sensor device in connection with a half-shaft axle for a vehicle.

Turning to FIG. 5, shown therein is a schematic of another half-shaft axle apparatus 502 for a vehicle. In this embodiment, the half-shaft axle 502 consists of a wheel hub connecting portion 504, an outer CV or other type of joint 506 (in this case, surrounded by a protective flexible boot), a shaft 508, and a differential connecting portion 510.

As shown, a portion of the axle shaft near the wheel hub connecting portion 504 may include a torque sensor 514, and a portion of the shaft near the differential connecting portion 510 may include a torque sensor 512. In some instances, both torque sensors 512, 514 may be included with the half-shaft axle 502, and one or both may be made operational during normal use. As described above, each torque sensor 512, 514 may be endowed with magnetically conditioned regions, each of which may consist of one or more bands or regions that have been polarized in generally alternating circumferential directions.

As also shown, corresponding non-contact magnetic field vector sensors 512-1, 512-2, ... 512-n may be positioned at a particular axial position and circumferentially spaced around the magnetically conditioned region at various substantially equal azimuth angles near each of the polarized bands or regions of the torque sensor 512 to measure an external magnetic flux from the polarized bands or regions upon application of a torque. Similarly, non-contact magnetic field vector sensors 514-1, 514-2, ... 514-n may be positioned around the magnetically conditioned region at various substantially equal azimuth angles near each of the polarized bands or regions of the torque sensor 514 (where, again, n represents the desired number of magnetic field sensors).

In the configuration shown, the torque provided by a power transmission shaft (which may be the power transmission shaft 304 or a front wheel drive power transmission shaft) will be transferred in part and applied to the a differential connecting portion 510 of the half-shaft axle apparatus 502, which will be applied to the shaft 508, then to the outer CV joint 506, and finally to the wheel hub connecting portion 504 (and finally to the wheel). The torque measured by the torque sensors 512, 514 may be related as shown generally below, taking into account losses including mechanical inefficiencies at the CV joint ($\varepsilon_{cv}$):

$$T510 = f \times T\text{-input} \tag{5}$$

$$T514 = 1/\varepsilon_{cv} \times T512 \tag{6}$$

Here, T-input is the applied torque provided by the power transmission shaft as measured at the location of a nearest torque sensor on the shaft, T512 is the measured applied torque on the differential connecting portion 510 at the location of the torque sensor 512, f is the fraction of torque transferred to the half-shaft axle apparatus 502 at the differential (e.g., 0% to 100%), T514 is the measured applied torque on the wheel hub connecting portion 504 at the location of the torque sensor 514, and $\varepsilon_{cv}$ represents mechanical inefficiencies of the kind described above, that arise from the CV joint.

Figure 6:
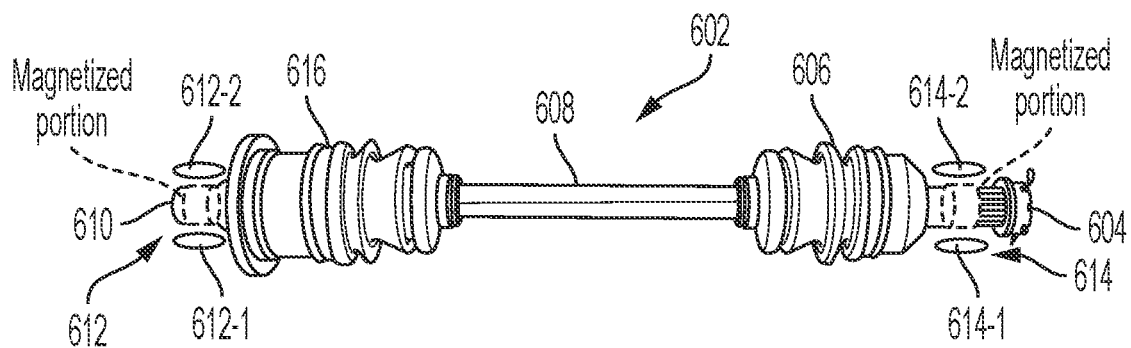
FIG. 6 is a schematic of a torque sensor device in connection with a half-shaft for a vehicle.

Turning to FIG. 6, shown therein is a schematic of another half-shaft axle apparatus 602 for a vehicle. In this embodiment, the half-shaft axle 602 consists of a wheel hub connecting portion 604, an outer CV or other type of joint 606 (including protective flexible boot), a shaft 608, an inner CV or other type of joint 616, and a differential connecting portion 610.

As shown, a portion of the axle shaft near the wheel hub connecting portion 604 may include a torque sensor 614, and a portion of the shaft near the differential connecting portion 610 may include a torque sensor 612. In some instances, both torque sensors 612, 614 may be included with the half-shaft axle 602, and one or both may be made operational during normal use. As described above, each torque sensor 612, 614 may be endowed with magnetically conditioned regions, each of which may consist of one or more bands or regions that have been polarized in generally alternating circumferential directions.

Corresponding non-contact magnetic field vector sensors 612-1, 612-2, ... 612-n may be positioned around the magnetically conditioned region at various substantially equal azimuth angles near each of the polarized bands or regions of the torque sensor 612. Similarly, non-contact magnetic field vector sensors 614-1, 614-2, ... 614-n may be positioned around the magnetically conditioned region at various substantially equal azimuth angles near each of the polarized bands or regions of the torque sensor 614 (where, again, n represents the desired number of magnetic field sensors).

In the configuration shown, the torque provided by the power transmission shaft (which may be the power transmission shaft 304 or a front wheel drive power transmission shaft) will be transferred in part and applied to the a differential connecting portion 610 of the half-shaft axle apparatus 602, which will be applied to the inner CV joint 616, and then to the shaft 608, and then to the outer CV joint 606, and finally to the wheel hub connecting portion 604 (and finally to the wheel). The torque measured by the torque sensors 612, 614 may be related as shown generally below, taking into account losses as previously described:

$$T610 = f \times T\text{-input} \tag{7}$$

$$T614 = 1/\varepsilon_{cv} \lambda T612 \tag{8}$$

Here, T-input is the applied torque provided by the power transmission shaft as measured at the location of a nearest torque sensor, T612 is the measured applied torque on the differential connecting portion 610 at the location of the torque sensor 612, f is the fraction of torque transferred to the half-shaft axle apparatus 602 at the differential (e.g., 0% to 100%), T614 is the measured applied torque on the wheel hub connecting portion 604 at the location of the torque sensor 614, and $\varepsilon_{cv}$ represents total or combined mechanical inefficiencies at the CV joints.

Figure 7:
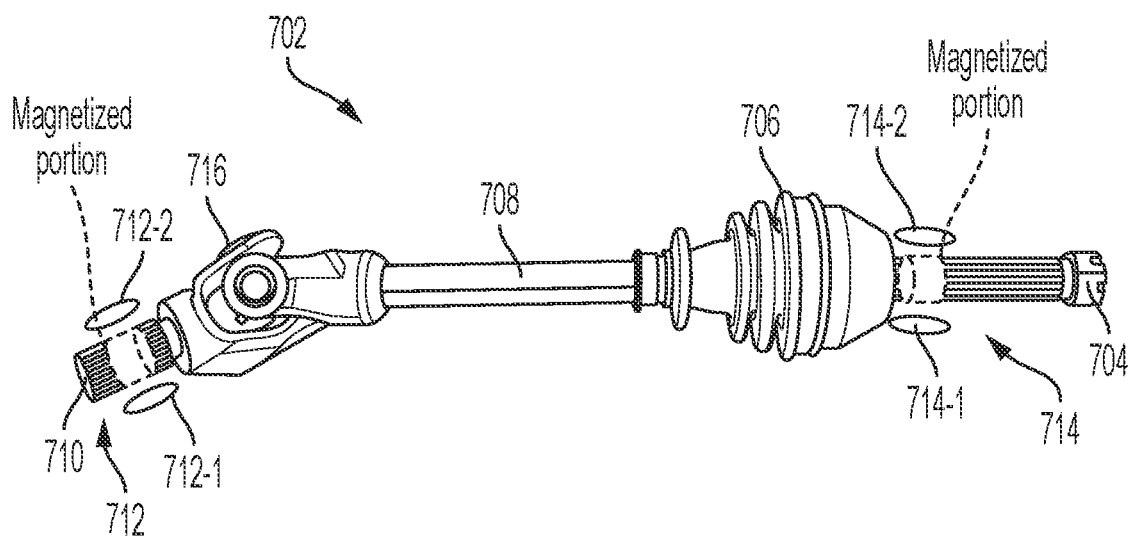
FIG. 7 is another schematic of a torque sensor device in connection with a half-shaft for a vehicle.

Turning to FIG. 7, shown therein is a schematic of another half-shaft axle apparatus 702 for a vehicle. In this embodiment, the half-shaft axle 702 consists of a wheel hub connecting portion 704, an outer CV or other type of joint 706 (including protective flexible boot), a shaft 708, a U-joint 716, and a differential connecting portion 710.

As shown, a portion of the axle shaft near the wheel hub connecting portion 704 may include a torque sensor 714, and a portion of the shaft near the differential connecting portion 710 may include a torque sensor 712. In some instances, both torque sensors 712, 714 may be included with the half-shaft axle 702, and one or both may be made operational during normal use. As described above, each torque sensor 712, 714 may be endowed with magnetically conditioned regions, each of which may consist of one or more bands or regions that have been polarized in generally alternating circumferential directions as previously described. Corresponding non-contact magnetic field vector sensors 712-1, 712-2, . . . 712-n may be positioned around the magnetically conditioned region at various substantially equal azimuth angles near each of the polarized bands or regions of the torque sensor 712. Similarly, non-contact magnetic field vector sensors 714-1, 714-2, . . . 714-n may be positioned around the magnetically conditioned region at various substantially equal azimuth angles near each of the polarized bands or regions of the torque sensor 714 (again, n represents the desired number of magnetic field sensors).

In the configuration shown, the torque provided by the power transmission shaft (which may be the power transmission shaft 304 or a front wheel drive power transmission shaft) will be transferred in part and applied to the a differential connecting portion 710 of the half-shaft axle apparatus 702, which will be applied to the U-joint 716, and then to the shaft 708, and then to the inner CV joint 706, and finally to the wheel hub connecting portion 704 (and finally to the wheel). The torque measured by the torque sensors 712, 714 may be related as shown generally below, taking into account losses as previously described:

$$T710 = f \times T\text{-input} \tag{9}$$

$$T714 = 1/\varepsilon_{cv} \times T712 \tag{10}$$

Here, T-input is the applied torque provided by the power transmission shaft as measured at the location of a nearest torque sensor, T712 is the measured applied torque on the differential connecting portion 710 at the location of the torque sensor 712, f is the fraction of torque transferred to the half-shaft axle apparatus 702 at the differential (e.g., 0% to 100%), T714 is the measured applied torque on the wheel hub connecting portion 704 at the location of the torque sensor 714, and $\varepsilon_{cv}$ represents total or combined mechanical inefficiencies at the CV and U joints.

Figure 8:
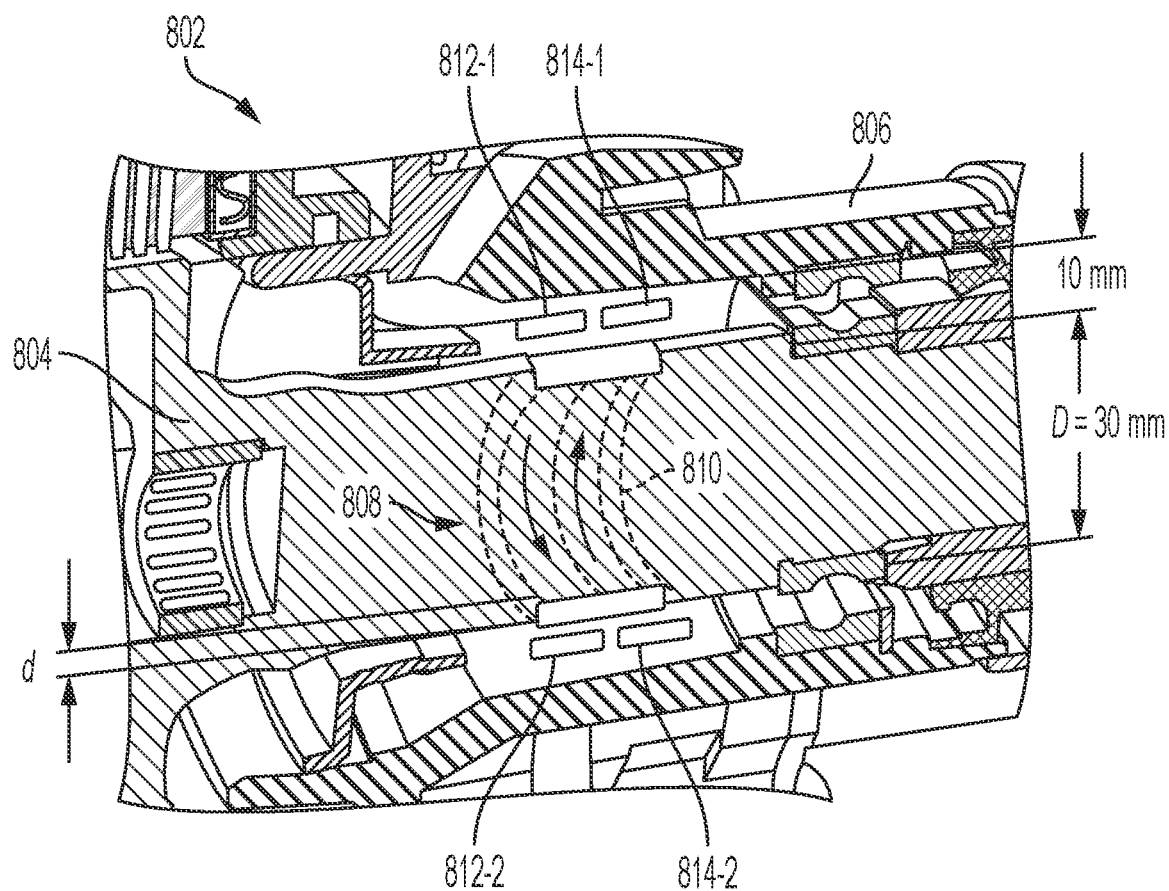
FIG. 8 is a schematic, cross-sectional, perspective view of a torque sensor device and rear transfer case for a vehicle.

Turning to FIG. 8, shown therein is a schematic, cross-sectional, perspective view drawing of a transfer case apparatus 802 for a vehicle, which includes a portion of a power transmission shaft 804 within a transfer case housing 806.

The portion of the power transmission shaft 804 shown may be solid or partially hollow and have a diameter, D), of approximately 30 mm. The shaft 804 may include a torque sensor 808 consisting of a portion of the power transmission shaft 804 that has been endowed with a magnetically conditioned region 810 integral to a portion of the shaft extending circumferentially around the shaft and into the shaft a distance radially from the surface forming a transducer portion of generally uniform thickness, d. The magnetically conditioned region 810 may be made in a portion of the power transmission shaft that is a ferromagnetic material, including carbon steel, and may include one, two, three or more alternating circumferentially-directed polarized bands or regions (only two bands are shown, which are substantially circumferentially polarized in the directions approximately shown by the arrows).

Corresponding non-contact magnetic field vector sensors 812-1, 812-2 . . . 812-n (only two shown) may be arranged at the same axial position circumferentially around one of the polarized bands or regions at various substantially equal azimuth angles (e.g., a pair of two sensors would be arranged at 180-degree azimuth angles). Similarly, non-contact magnetic field vector sensors 814-1, 814-2 . . . 814-n (only two shown) may be arranged at a different axial position than the magnetic field sensors 812, and circumferentially around the other one of the polarized bands or regions and at various substantially equal azimuth angles.

Each group of magnetic field sensors 812, 814 is generally oriented in pairs to detect the magnetic field created when an applied torque on the power transmission shaft 804 causes and external magnetic flux to arise from the magnetically conditioned region 810. The magnetic field sensor pairs have their sensing directions arranged to determine the direction of rotation of the power transmission shaft 804 and the magnitude of the torque applied to the shaft. Additional secondary magnetic field sensors (not shown) may be used in addition to the magnetic field sensors 812, 814 to improve signal processing (e.g., to account for magnetic noise, such as near and far field ambient magnetic fields, that may be present in the output signals from the individual magnetic field sensors 812, 814).

The transfer case housing 806 is preferably made of a material such as aluminum having low permeability with regard to the magnetic flux emanating from the magnetically conditioned region 810 when a torque is applied to the power transmission shaft 804. The available space within the transfer case housing 806 may vary between vehicle makes and models, but should be large enough to accommodate the magnetic field sensors 812, 814 (and secondary sensors). The void space inside the transfer case housing 806 may be filled or partially filled with unpressurized hydraulic oil.

As shown, the small space surrounding the power transmission shaft 804 may be as small as approximately 10 mm, but this is generally sufficient for operation of the magnetic field sensors 812, 814 and secondary magnetic field sensors.

Figure 9:
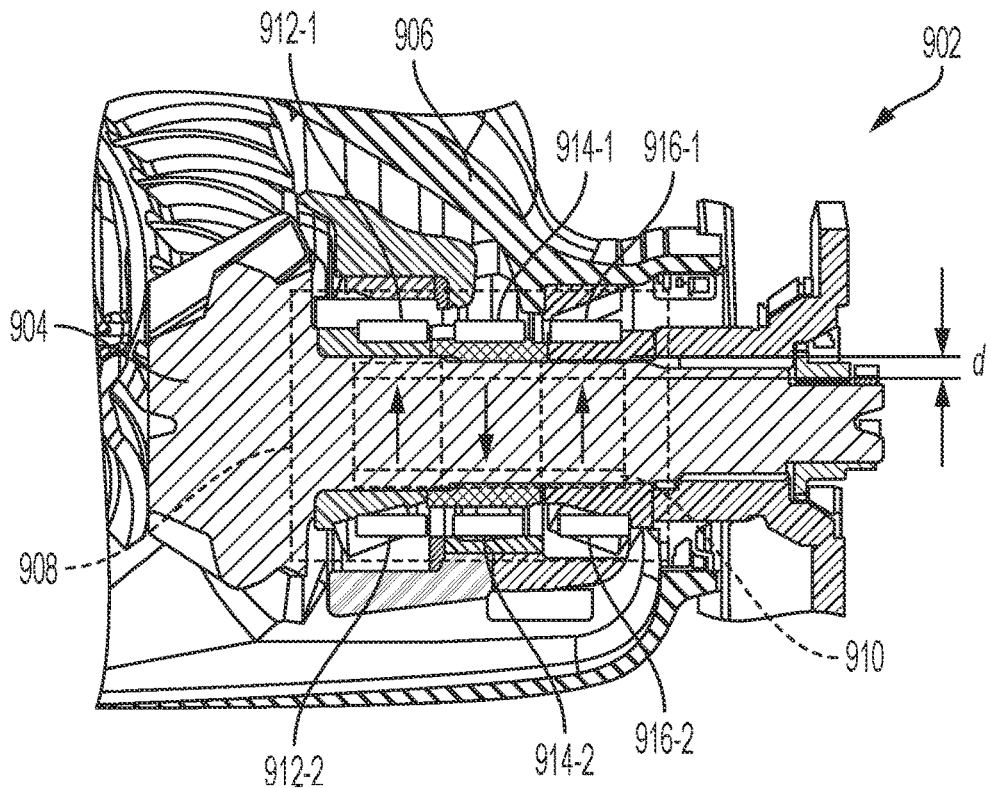
FIG. 9 is another schematic, cross-sectional, perspective view of a torque sensor device and transfer case for a vehicle.

Turning to FIG. 9, shown therein is a schematic, cross-sectional, perspective view drawing of another exemplary transfer case apparatus 902 for a vehicle, which includes a portion of a power transmission shaft 904 within a transfer case housing 906.

As in the embodiment described above, the portion of the power transmission shaft 904 shown may be solid or partially hollow and have a diameter, D), of approximately 30 mm. The shaft 904 may include a torque sensor 908 consisting of a portion of the power transmission shaft 904 that has been endowed with a magnetically conditioned region 910 integral to a portion of the shaft extending circumferentially around the shaft and into the shaft a distance radially from the surface forming a transducer portion of generally uniform thickness, d. The magnetically conditioned region 910 may be made in a portion of the power transmission shaft that is a ferromagnetic material, including carbon steel, and may include one, two, three or more alternating circumferentially-directed polarized bands or regions (in this example three bands are used, which are substantially circumferentially polarized in the directions approximately shown by the arrows).

Corresponding non-contact magnetic field vector sensors 912-1, 912-2 . . . 912-n (only two shown) may be arranged at the same axial position circumferentially around one of the polarized bands or regions at various substantially equal azimuth angles (e.g., a pair of two sensors would be arranged at 180-degree azimuth angles). Similarly, non-contact magnetic field vector sensors 914-1, 914-2 . . . 914-n (only two shown) may be arranged at a different axial position than the magnetic field sensors 912, and circumferentially around another one of the polarized bands or regions and at various substantially equal azimuth angles. In the embodiment shown, a third set of non-contact magnetic field vector sensors 916-1, 916-2 . . . 916-n (only two shown) may be arranged at a different axial position than the magnetic field sensors 912, 914 and circumferentially around the other one of the polarized bands or regions and at various substantially equal azimuth angles.

Each group of magnetic field sensors 912, 914, 916 is generally oriented in pairs to detect the magnetic field created when an applied torque on the power transmission shaft 904 causes an external magnetic flux to arise from the magnetically conditioned region 910. The magnetic field sensor pairs have their sensing directions arranged to determine the direction of rotation of the power transmission shaft 904 and the magnitude of the torque applied to the shaft. Additional secondary magnetic field sensors (not shown) may be used in addition to the magnetic field sensors 912, 914, 916 to improve signal processing (e.g., to account for magnetic noise, such as near and far field ambient magnetic fields, that may be present in the output signals from the individual magnetic field sensors 912, 914, 916).

As in the previous embodiment, the transfer case housing 906 is preferably made of a material such as aluminum having low permeability with regard to the magnetic flux emanating from the magnetically conditioned region 910 when a torque is applied to the power transmission shaft 904. The available space within the transfer case housing 906 may vary between vehicle makes and models, but should be large enough to accommodate the magnetic field sensors 912, 914, 916 (and secondary sensors). The void space inside the transfer case housing 906 may be filled or partially filled with unpressurized hydraulic oil.

Figure 10:
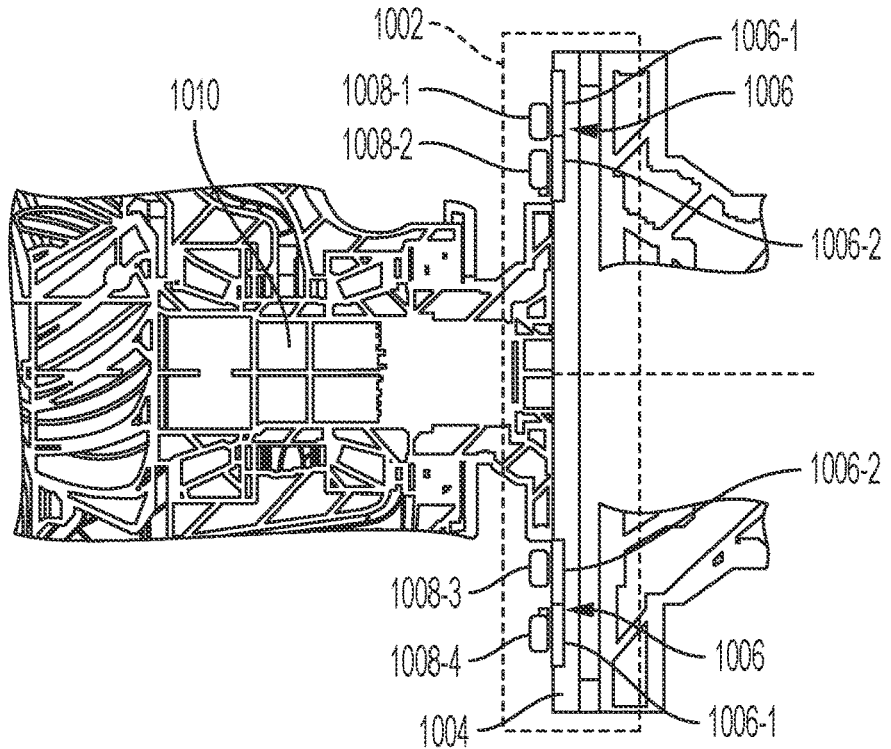
FIG. 10 is a schematic, cross-sectional view of a torque sensor device, transmission drive plate for a vehicle.

Turning to FIG. 10, shown therein is a schematic, cross-sectional view of a torque sensor 1002 (as generally indicated by the broken line box) of a transmission drive plate 1004 for a vehicle. As shown, the transmission drive plate 1004 may include a magnetically conditioned region 1006 in the form of two radial-extending annular magnetically polarized ring-shaped regions or bands 1006-1, 1006-2. The outer magnetically polarized region or band 1006-1 includes associated magnetic field vector sensors sensor pairs 1008-1, 1008-4, and the inner magnetically polarized region or band 1006-2 includes associated magnetic field vector sensor pairs 1008-2, 1008-3. Each pair of sensors together may provide a measure of the torque (magnitude and direction) that may be applied by the transmission drive plate 1004 to, for example, a power transmission shaft 1010.

Figure 11:
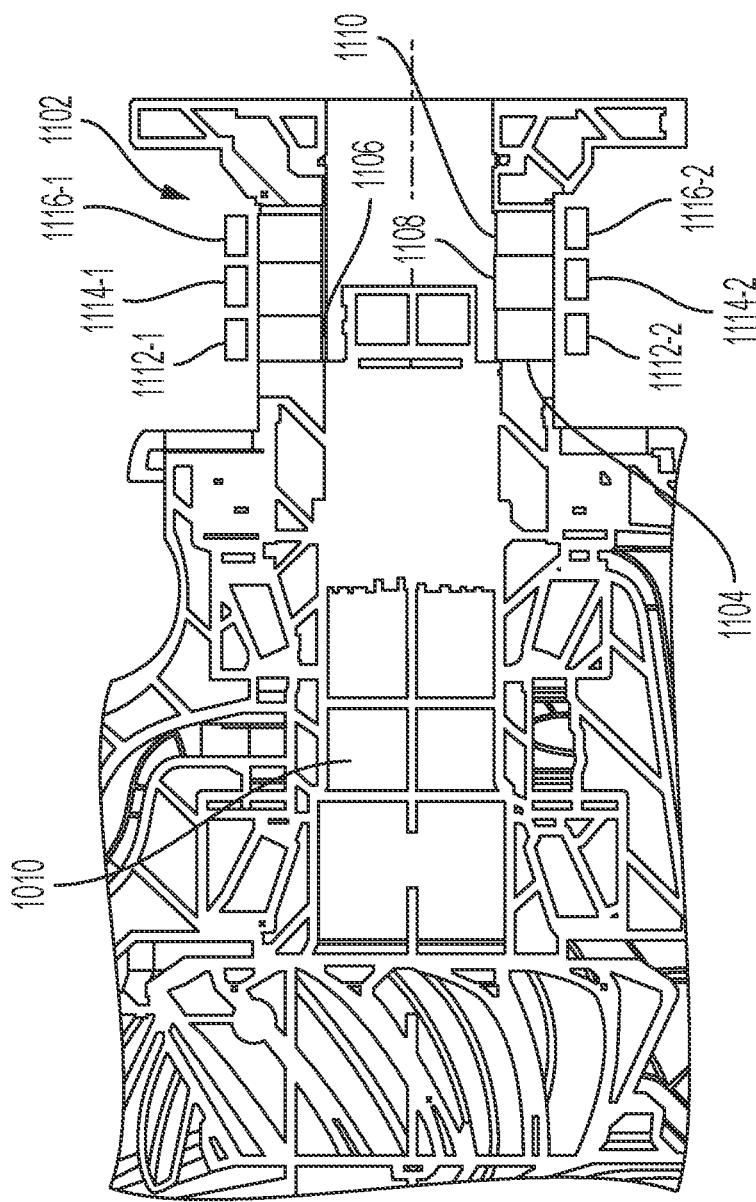
FIG. 11 is a schematic, cross-sectional view of a torque sensor device and modified transmission of FIG. 9 for a vehicle.

Turning to FIG. 11, shown therein is an alternative arrangement of the apparatus of FIG. 10 in which the power transmission shaft 1010 is extended along its longitudinal axis to permit a portion of the power transmission shaft 1010 (or a portion of the shaft) or a housing around the power transmission shaft 1010 to be equipped with a torque sensor 1102, which may be endowed with a magnetically conditioned region 1104 having three axially extending, circumferentially directed, magnetically polarized regions or bands 1106, 1108, 1010 as described above. Each magnetically polarized regions or bands 1104, 1106, 1008 is associated with a pair (or more) of magnetic field vector sensors.

Corresponding non-contact magnetic field vector sensors 1112-1, 1112-2 . . . 1112-n (only two shown) may be arranged at the same axial position circumferentially around one of the polarized regions or bands at various substantially equal azimuth angles (e.g., a pair of sensors would be arranged at 180-degree azimuth angles). Similarly, non-contact magnetic field vector sensors 1114-1, 1114-2 . . . 1114-n (only two shown) may be arranged at a different axial position than the magnetic field sensors 1112, and circumferentially around another one of the polarized regions or bands and at various substantially equal azimuth angles. In the embodiment shown, a third set of non-contact magnetic field vector sensors 1116-1, 1116-2 . . . 1116-n (only two shown) may be arranged at a different axial position than the magnetic field sensors 1112, 1114 and circumferentially around the other one of the polarized regions or bands and at various substantially equal azimuth angles.

Each group of magnetic field sensors 1112, 1114, 1116 is generally oriented in pairs to detect the magnetic field created when an applied torque on the power transmission shaft 1010 causes an external magnetic flux to arise from the magnetically conditioned region 1104. The magnetic field sensor pairs have their sensing directions arranged to determine the direction of rotation of the power transmission shaft 1010 and the magnitude of the torque applied to the shaft. Additional secondary magnetic field sensors (not shown) may be used in addition to the magnetic field sensors 1112, 1114, 1116 to improve signal processing (e.g., to account for magnetic noise, such as near and far field ambient magnetic fields, that may be present in the output signals from the individual magnetic field sensors 1112, 1114, 1116).

In each of the configurations above, the placement of torque sensors and their components are represented schematically for ease of description and illustration. One skilled in the art will appreciate that the magnetically conditioned regions (transducers) and magnetic field vector sensors may be arranged and configured in different locations on the power train of a vehicle to provide for sufficient detectable magnetic flux, magnetic field sensing and sensing accuracy, repeatability, and torque sensor lifespan, among other design specifications and requirements.

In each of the configurations above, the shaft-type and disk-type torque sensors may be formed of a homogeneous material or may be formed of a mixture of materials. At least some of the material must be sufficiently ferromagnetic to ensure the existence of magnetic domains for at least forming a remanent magnetization in the magnetically conditioned regions. The material must be magnetostrictive such that the orientation of magnetic field lines above the magnetically conditioned regions or bands may be altered by the stresses associated with an applied torque.

Both the shafts and the disk transducers may be completely solid or they may be partially hollow: The diameter of the power transmission shaft may be, for example, about 30 mm. The thickness of the disk may be, for example, about 1 cm. The diameter of the left and right half-shafts may vary according to the specific vehicle type.

The magnetic field vector sensors are positioned proximate to the magnetically conditioned regions at a location where the magnetic field strength is at a maximum. The individual sensors are oriented such that their sensitive directions are perpendicular to the direction of magnetization in the magnetically conditioned regions. Such a configuration ensures that the representative signals outputted by the individual magnetic field sensors vary approximately linearly with respect to variations in the torque applied to the shaft or disk.

The placement of pairs of individual magnetic field sensors provides for common mode rejection of noise. Output signals from each of the magnetic field sensors in a respective pair of sensors may be summed to provide a signal representative of the torque applied to the shaft/disk. Any external magnetic fields will have equal effects on each of the magnetic field sensors in the pair. Because the magnetic field sensors in the pair are oppositely polarized, the summed output of the magnetic field sensors is zero with respect to the external magnetic fields. However, because the magnetically conditioned regions include regions or bands that are oppositely polarized, as are the respective magnetic field sensors, the summed output of the magnetic field sensors is the differential of each individual magnetic field sensor with respect to the torque applied to the shaft/disk. Therefore, placing magnetic field sensors in a common mode rejection configuration reduces the detrimental effects of compassing on the torque sensor device output signal.

As described above, in some embodiments, the magnetically conditioned region may include two, three, or more regions or bands that are oppositely or alternately polarized, with magnetic field lines generally arranged in opposite circumferential directions. A pair of magnetic field sensors may be positioned proximate to each of the regions or bands over the portion the regions or band where the magnetic field strength is at a maximum.

As described above, the magnetic field vector sensors for each region or band may include multiple individual magnetic field sensors, for example four sensors positioned at 90-degrees, 180-degrees, 270-degrees, and 360-degrees around the shaft. Individual magnetic field sensors may be configured in such a way to address a noise source (not shown) that creates a local magnetic field gradient having different effects on each of the individual magnetic field sensors.

As discussed above, in the quiescent state, the magnetic fields in the magnetically conditioned regions are zero (no external flux generated) or they are aligned either substantially exclusively in the axial direction or substantially exclusively in the circumferential direction, depending on how the magnetically conditioned regions was initially formed. When torque is applied, the magnetic moments in the magnetically conditioned regions tend to tilt helically along the shear stress direction, which forms an angle of about 45 degrees with respect to the surface of the shaft, as described in more detail in the aforementioned references. This tilt causes the magnetization of the magnetically conditioned region to exhibit a decreased component in the initial direction, and an increased component in the shear stress direction. The degree of tilt is proportional to the strength of the applied torque. The magnetic field sensors are capable of sensing changes in the strength of magnetic field components along the sensitive directions of the magnetic field sensors. Therefore, when torque is applied to the shaft/disk, the magnetic field sensors output representative signals that are proportional to the applied torque.

Suitable magnetic field sensors for this application are those available from Methode Electronics, Inc. (Chicago) and include flux-gate inductors, Hall Effect sensors, and the like. Preferably, the magnetic field sensors according to the present invention are flux-gate inductors having a solenoidal form.

Software

Figure 12:
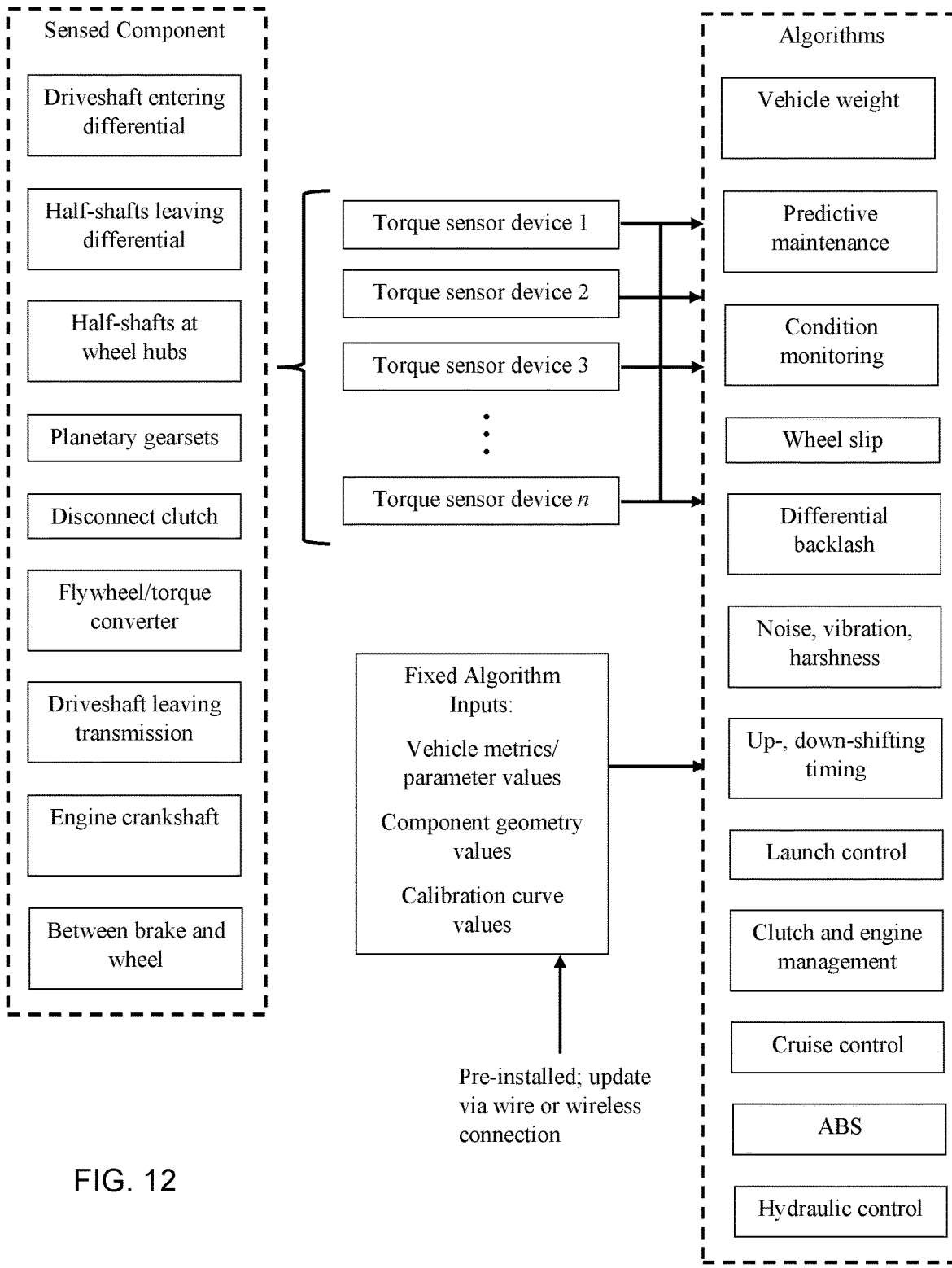
FIG. 12 is a schematic showing some of the vehicle components monitored by one or more torque sensor devices.

Turning now to FIG. 12, shown therein is a schematic showing some of the vehicle components monitored by one or more torque sensor devices ("Sensed Components") and the software modules or computations improved by the input of signal information from the torque sensor devices ("Algorithms"). The computation aspects of the invention include at least a signal processing circuit for receiving, depending on the specific vehicle configuration, the individual or combined magnetic field sensor signals from the individual magnetic field sensors associated with:

(1) the torque sensors 316, 318, 320 associated with the rear differential apparatus 302 (FIG. 3A);
(2) the torque sensors 320, 322 associated with the crown gear when 308 and a left rear half-shaft axle 312 (FIG. 3B);
(3) the torque sensors 426, 430, 440 associated with the rear differential apparatus 402 and the right rear half-shaft 414 (FIG. 4);
(4) the torque sensors 512, 514 associated with the half-shaft axle apparatus 502 (FIG. 5);
(5) the torque sensors 612, 614 associated with the half-shaft axle apparatus 602 (FIG. 6);
(6) the torque sensors 712, 714 associated with the half-shaft axle apparatus 702 (FIG. 7);
(7) the torque sensor 808 associated with the transfer case apparatus 802 (FIG. 8);
(8) the torque sensor 908 associated with the transfer case apparatus 902 (FIG. 9);
(9) the torque sensor 1002 associated with the transmission drive plate 1004; and
(10) the torque sensor 1102 associated with the power transmission shaft 1010 (FIG. 11).

Figure 13:
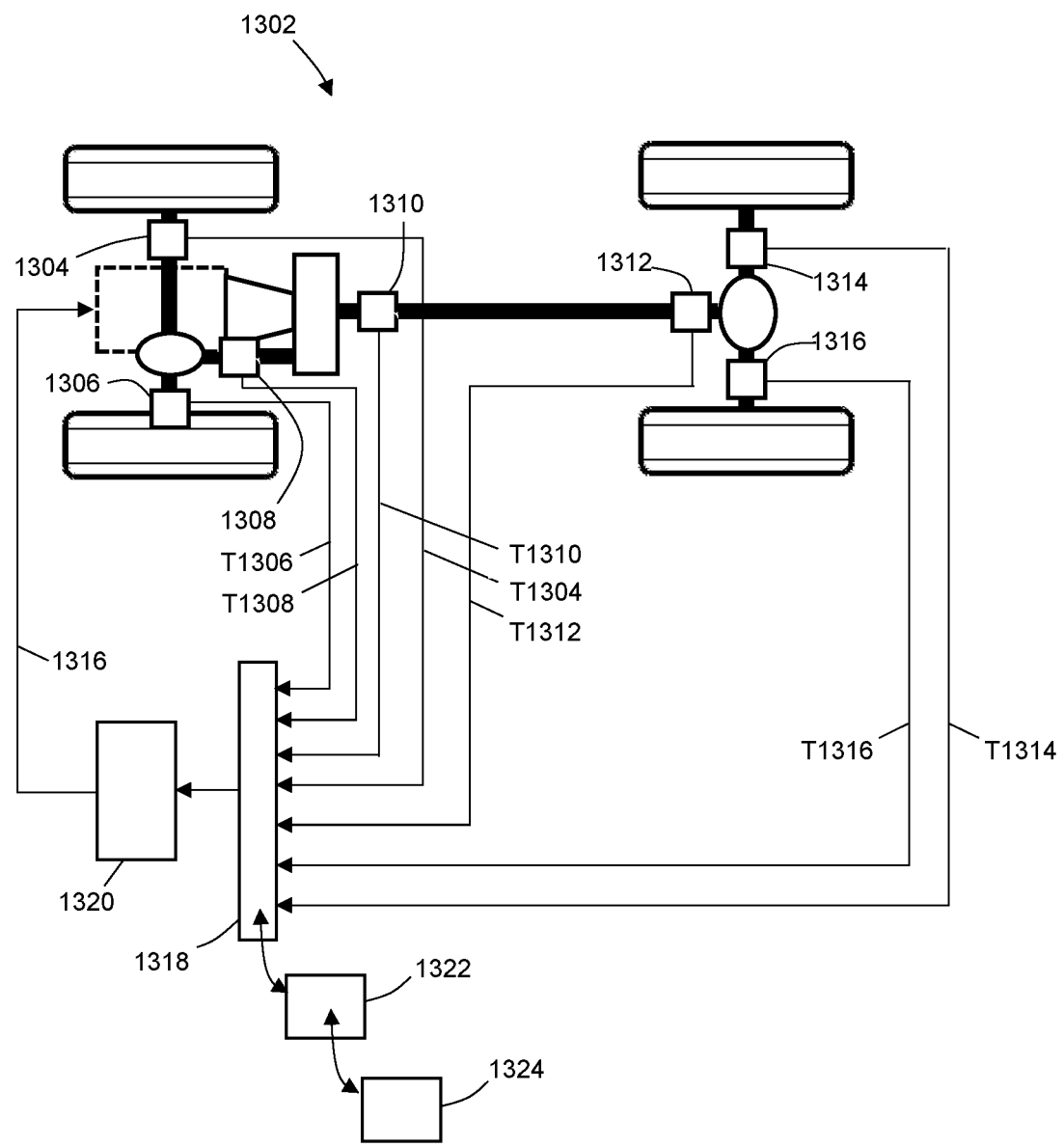
FIG. 13 is a schematic showing drive train and differential components for use in a vehicle along with individual torque sensors.

Turning to FIG. 13, shown therein is a schematic drawing of certain vehicle components of a vehicle 1302, which includes (with reference to FIGS. 1 and 3A), for a front-and/or rear-wheel drive vehicle, a transmission 103, a transfer case 104, a front power transmission drive shaft 105, a front differential 106, a left-front half-shaft axle, a right-front half-shaft axle, a rear power transmission drive shaft 304, a rear differential 322, a left-rear half-shaft axle 312, and a right-rear half-shaft axle 314. As shown schematically, one or more individual torque sensors 1304, 1306, 1308, 1310, 1312, 1314, 1316 (in addition to other torque sensors shown in, for example, FIGS. 3B-11) may be located approximately where indicated to provide dynamic feedback during operation of the vehicle 1302. For example, each torque sensor may output a respective signal T1304, T1306, T1308, T1310, T1312, T1314, T1316 that reflects the torque measured by the individual torque sensors 1304, 1306, 1308, 1310, 1312, 1314, 1316.

Not all of the torque sensors may be needed in a particular vehicle, as some vehicles may only need specific sensors at selected positions. In some instances, where reliance on known relationships between components (e.g., efficiency) is possible, sensors on both sides of a force-transferring connection may be unnecessary. Even so, more torque sensors than are needed may be installed during manufacturing because it may be more expensive to retrofit components of the vehicle to add sensors later. In such cases, certain torque sensors may be installed but not made operational, though they could be made operational by making electrical connections or simply updating firmware or software settings.

The signals from each torque sensor may be outputted from a local signal processing module associated with each torque sensor. These local modules may receive and process individual signals from each individual magnetic field vectors sensors associated with each torque sensor.

One or more electronic control units 1318 (only one shown) may be used to receive one or more of the individual output signals T1304, T1306, T1308, T1310, T1312, T1314, T1316 during operation. Depending on the specific application, selective ones of the output signals may be used as input to a particular algorithm, as discussed above. Outputs from the algorithms may be sent from the electronic control units 1318 to an on-board computer 1320 installed in the vehicle 1302, which may include engine management software for outputting a control signal to control, for example, engine or motor power output.

A memory device 1322 may be associated with one or more of the electronic control units 1318 for storing in memory a table, database, and/or knowledgebase 1324, which may be uploaded to the memory device by the manufacturer of the vehicle, the vehicle owner or operator, or some other party, either by wired connection or wirelessly using a transceiver (not shown). The stored information may include one or more numerical values, functions (such as a step-up function, amplification function, ramp function, or other), criteria (such as high-low ranges, maximum value, low value, intensity, or other), calibration curves (such as slope-intercept values), input-output or decision pairs (i.e., if this, do this, else do this), machine learning models (such as classification), a set of states or conditions(S), a set of actions (A) associated with states (i.e., for each S in a set, A corresponds to Si), historical logs, other algorithms, or other stored information used to assess a particular vehicle characteristic, as input to one or more of the algorithms stored in the memory device, or for adjusting the incoming signals, or comparing algorithm outputs to assess actions to take.

A state may be or reflect a position, a setting, a flow rate, and linear velocity, a rotational velocity, an acceleration, a power state, an amount of current, a sound frequency, a sound level, a vibration frequency, a fluid fill level, and opacity, a temperature, a pressure, a concentration, a material selection, a brightness, an output, an amount of data storage, or other physical or chemical state associated with a static or moving vehicle.

By way of non-limiting example, given a vehicle characteristic state $S_0$ at time to, and a set of possible actions, A, associated with the state, a particular algorithm may identify in memory device 1322 the possible next actions A1 or A2 to take next. However, once torque signals T1314, T1316 are obtained at time t1 from the torque sensors 1314, 1316, reflecting the torque at each of the left and right rear half-shaft axles (which combined with other sensors might indicate wheel slip), the algorithm may identify action A3 as the next action to take, as follows.

$$A(S_{t0}|T_{t0})=A1 \text{ or } A2 \quad (11)$$

$$A(S_{t1}|T1314_{t1},T1316_{t1})=A3 \quad (12)$$

Each torque sensor may include a lead or cable leading to a connector for interfacing with a printed circuit board in the electronic control units 1318, which may include a connector for interfacing with the on-board computer 1320 of the vehicle 1302. Logic circuits for each of the applications described below may be embodied in one or more of the printed circuit boards, which may be located in one or more modules of the electronic control units 1318 each with its own input and output connectors, power supply, and housing, as needed.

Applications

By way of non-limiting examples, torque information from the torque sensor devices as previously described may be useful in determining vehicle weight. Torque information may also be useful in predictive maintenance (detecting issues before catastrophic failures), for condition monitoring (for example if someone uses chip tuning and is over-torqueing above the torque rating of a transmission), and for wheel slip detection during acceleration and breaking (though in that use case, a suitable sensor would be located between the brake and the wheel touching the road).

In the case of vehicle weight, a dynamic vehicle weight calculation involves at least the following input parameters, some of which may be a pre-determined or fixed value, while others may be directly measured using a torque sensor device as described herein and other sensors:
  (1) Engine horsepower
  (2) Torque (measured at the output of the engine, each wheel, and the power transmission shaft(s))
  (3) Speed (rpm), engine
  (4) Velocity and acceleration
  (5) Fixed sizes and masses (wheels, shafts, chassis, other components)
  (6) Gear ratios (transfer case, differentials)
  (6) Correction factors (accounting for efficiencies/losses, temperature, humidity, drag and rolling resistance, added loads)

Among other configurations and uses, a torque sensor device of the kind described above may be used to provide information to supplement a torque measurement of a powertrain of a vehicle, including, for example, a measurement by a sensor mounted in a mounting hole in a housing used for powertrain components. In one aspect, the torque sensor device may be used to measure an amount of torque applied to a transmission sprocket disc within the housing.

In another configuration and use, a torque sensor device of the kind described above may be used inside a rotating shaft, and/or in connection with a planetary gearset within a housing. In one aspect, room for the torque sensor device (or multiple such devices) may be provided by modifying a traditional housing, such as by extending a portion of a main housing to form a cavity of sufficient capacity to accept the magnetic field vector sensors. As needed, a transmission shaft extending through the cavity formed by the housing may be modified, such as by elongating the same, to provide for a magnetoelastically active region on the shaft itself.

In yet another configuration and use, a torque sensor device of the kind described above may be used to adjust operation of powertrain components to achieve a desired driveline torque by monitoring an actual driveline torque, which may involve adjusting operation a driveline disconnect clutch. A system-level signal from one or more torque sensors may be used as feedback to a driveline disconnect actuator to compensate for errors in the operation of the disconnect clutch to achieve the desired torque.

In another configuration and use, a mass computation may be performed to determine an effective center-of-mass total weight of a vehicle, accounting for the vehicle, passengers, cargo and other materials carried by the vehicle, attached tow vehicles, added components, and other mass-bearing items. The computation may be performed using various inputs such as inertia of rotating components, acceleration (calculated or measured using an accelerometer), velocity (calculated or measured), torque/force at the drive wheels, resistances to movement (i.e., ground friction, wind resistance), overall torque ratio, power transmission efficiency, geometry of rotating components, tire pressure, temperature, and others. Each input may be computed in real-time during operation of the vehicle. Some inputs may be fixed and correlated with each other, and thus may be provided by way of lookup table if one is known (i.e., a calibration "curve," such as a linear equation that takes one input and provides a correlated output).

In yet another configuration and use, a torque sensor device of the kind described above may be employed to improve shifting in a transmission component by accurately detecting a start of a torque-phase shift. This may be done by indirectly measuring input torque at a transmission input shaft, specifically by monitoring for an initial rise in the output signal that is indicative of a measured torque at the transmission input shaft.

In another configuration and use, a torque sensor device of the kind described above may be employed to provide feedback to a direct-measure torque sensor system used in a dual-clutch automatic transmission. In a dual-clutch automatic transmission where a direct measurement of torque at a drive plate of the dual-clutch transmission is performed, useful monitored information may be obtained to help improve clutch control and power transmission from the engine to the drive wheels. Information about the status of the drive wheels, such as slippage, may further improve the automatic transmission function. Thus, torque sensor devices may be positioned at the input shaft of a differential and at each of the half-shafts extending from the differential to the drive wheels to provide the feedback (input) to the automatic transmission sensor algorithm to improve performance of the dual-clutch automatic transmission. Additional torque sensor devices of the kind described above, used between the brakes and wheels, could also be used to provide additional information to the clutch controller and engine power management controller.

In yet another configuration and use, a torque sensor device of the kind described above may be further employed to provide feedback (input) for a sensor system used to monitor the friction elements of an automatic transmission for purposes of controlling up- and down-shifting of the transmission. Such a sensor system would provide information about the input torque and speed of a transmission input shaft, information about the output torque and speed of an output shaft from the transmission, and information about the vehicle's speed and throttle position. One or more of the torque sensor devices may be positioned at the input shaft of a differential and at each of the half-shafts extending from the differential to the drive wheels to provide the necessary feedback (input) to the up- and down-shifting algorithm.

In yet another configuration and use, a torque sensor device of the kind described above may also be employed to improve the calculation of torque at an on-going friction element (i.e., comparing the torque to a pre-determined target torque value), which is useful in controlling an off-going friction element, in a multi-ratio transmission mechanism. Typically, a torque sensor is located at one or both of a transmission torque input shaft and output shaft for that purpose. However, additional torque sensor devices of the type presently described may be added at the input shaft of a differential and at each of the half-shafts extending from the differential to the drive wheels to provide additional feedback to better estimate the output torque of the transmission mechanism. Those additional torque sensor devices help improve the accurate estimate of the torque experienced by the friction elements within the transmission during a shifting event, compared to an estimate that relies solely on the transmission shaft input and output torques.

Moreover, where torque measurements are not available at key locations, a controller must rely on an estimated torque value that is obtained from a torque profile, which itself is determined from other monitored parameters associated with a vehicle and therefore may be less accurate than direct measurements. The addition of one or more torque sensor devices of the kind described above at the input shaft of a differential and at each of the half-shafts extending from the differential to the drive wheels may lessen the need to rely on torque profiles.

In still another configuration and use, the addition of torque sensor devices of the kind described above at the input shaft of a differential and at each of the half-shafts extending from the differential to the drive wheels may provide additional input data to an algorithm for estimating the level of noise, vibration, and harshness in powertrain components.

The addition of one or more torque sensor devices of the kind described above at the input shaft of a differential and at each of the half-shafts extending from the differential to the drive wheels may also provide needed information for use in better controlling a manual transmission gearshift, specifically to provide input to a controller that determines a clutch torque transmitted through an input clutch related to a desired gear after a shift lever is manually moved.

In yet another configuration and use, the addition of torque sensor devices of the kind described above at the input shaft of a differential and at each of the half-shafts extending from the differential to the drive wheels may provide additional input data to an algorithm for estimating the amount of backlash at a torsional discontinuity during a change in the direction of torque. A torsional discontinuity may exist between a drive pinion gear attached to a transmission shaft, a crown wheel gear attached to one half-shaft, and a bevel gear attached to the other half-shaft, all of which are inside a rear or front differential housing. The torsional discontinuity appears at the time when an input torque, which is transferred by individual gear teeth surfaces in contact with other gear teeth surfaces, is reduced or changes direction causing the contact between the gear teeth to change (i.e., no contact or less contact). Using the present torque sensors on all three shafts noted above can improve the detection of this transient backlash period and provide feedback to an appropriate transmission and/or motor controller, which in turn can use the information to improve drivability.

In still another use, the addition of torque sensor devices of the kind described above at the input shaft of a differential and at each of the half-shafts extending from the differential to the drive wheels of a vehicle may provide additional input data to an algorithm for controlling power output of the vehicle's engine to adjust a distance it follow another vehicle during autonomous or semi-autonomous operation. In autonomous or semi-autonomous mode, a controller may adjust the engine's power to maintain a pre-determined or driver-inputted following distance. The power may be adjusted using information about the actual distance, the mass of the vehicle, the road grade, and other parameters. Some of those parameters may be calculated from an estimate of an amount of force applied by the wheels to the road surface, which itself may be estimated indirectly by measuring or obtaining information about a tire radius, a torque output of an engine, a transmission gear, a transmission drive ratio, and other parameters. However, the present sensors would provide a more direct measure of the amount of force applied by the wheels to the road and thus a more accurate determination of the amount of engine power output needed to maintain a specific following distance.

In another use, the outputs from the two half-shaft torque sensors of the kind described above along with outputs from torque sensor devices located between the brakes and the wheels may be useful as input to a controller used to control individual wheel speed of wheels attached to a shared differential by applying a selective amount of braking pressure to each of the wheels independently. This may be useful, for example, when anti-lock braking systems (ABS) are engaged and one of the shared wheels slides (catches) on the road surface for a brief period instead of continuing to rotate while the other wheel continues to rotate. A useful reduction in the vibration that may occur when of the ABS system under such conditions systematically adjusts brake pressure could be improved by the placement of the present torque sensors as described above.

In still another use, one or more torque sensor devices of the kind described above, including torque sensor devices at the input shaft of a differential and at each of the half-shafts extending from the differential to the drive wheels of a vehicle, may provide additional input data for a cruise control algorithm for accurately controlling engine power output and maintaining separation distance between vehicles on the road.

In another use, the outputs from one or more torque sensor devices of the kind described above may provide data that, when compared to predetermined criteria, can indicate an anomaly in a vehicle operating characteristic that requires maintenance. An event may be logged in a memory device, along with related data for diagnostic purposes, when an amount of torque directly measured (or calculated from indirect measurements) during a shifting event of an automatic transmission component is outside prescribed ranges or above or below certain limits. A visual and/or audible alert could be provided to the operator indicating the possible need for maintenance. The amount of torque being measured could be related to, for example, the torque applied or transmitted by a gear or gear switching component, a power transmission shaft, an axle or half-axle of a drive wheel, brake, or other component. The comparison criteria may be associated with models of the above and other components or assemblies of multiple components, and may be determined during a design stage of the component/assembly, or from subsequent testing of the final components/assembly. The criteria may be stored in a memory device in the form of a linear or non-linear relationship between parameters, specific high/low values, or specific ranges of acceptable values.

In yet another use, a torque sensor device of the kind described above at the input shaft of a differential and at each of the half-shafts extending from the differential to the drive wheels of a vehicle may provide additional input data to an algorithm for adjusting the hydraulic pressure used to engage a clutch within a gearbox. Typically, hydraulic pressure may be adjusted by opening and closing (or partially opening and closing) a valve and/or changing the flow rate output from a hydraulic pump that permits hydraulic fluid to fill a space. The valve and/or pump may be controlled by a hydraulic control system in part by using direct measurements of a driver demand torque at the input of a transmission and a direct measurement at the output (drive shaft), taking into account the configuration of specific clutch and gearset elements between the input and output. However, the amount of output torque directly measured at the output shaft of the transmission may be improved, and thus the adjustments in hydraulic pressure (and thus activation of clutch components) may be improved, with the additional input data noted above. Input data may reflect information about an instantaneous torque measurement obtained by one or all of the additional torque sensor devices, a rate of change in the torque measurement, and/or a percent fluctuation (standard deviation) from a nominal (median) actual value measured over a period of time, which information may be feed back to a suitable valve/pump controller module.

In another use, a torque sensor device of the kind described above at the input shaft of a differential and at each of the half-shafts extending from the differential to the drive wheels of a vehicle may provide additional input data to an algorithm used to control a launch of a vehicle from a standing start when the vehicle is using "launch control" or "track" mode. Launch control requires accurate measurements of power at all drive wheels during a sudden onset of power output from the engine or motor, which the additional torque sensor devices noted above provide. In that case, a calculated vehicle characteristic may be a wheel rotational velocity and a current state of the vehicle may be a power output demand from an engine or motor of the vehicle indicated by a throttle pedal position.

In yet another use, a calculated vehicle characteristic may be a fuel efficiency and a current state of the vehicle may be a position of an intake valve and fuel pump setting. A torque sensor device of the kind described above may be used to provide information for calculated the fuel efficiency at a particular time or time period, and combined with information about available intake valve positions and fuel pump flow rate settings, a signal may be generated to alter the valve positions and/or fuel flow rate to improve fuel efficiency.

At least one benefit of using the torque sensors in the manner described above and in other applications is the ability to obtain useful information about a vehicle characteristic immediately prior to an application of a force to a component of the vehicle. In more traditional approaches, sensors are placed to assess a condition or state after a force has been applied, but such a feedback loop may permit an unwanted condition to arise. For example, identifying an amount of torque split between left and right half-shaft axles at a differential may be useful in predicting the possibility of wheel slip, whereas a sensor associated with an automatic brake system (ABS) may only sense wheel slip after the unsafe condition arises and is measurable by the ABS sensors.

Although certain presently preferred embodiments of the disclosed invention have been specifically described herein, it will be apparent to those skilled in the art to which the invention pertains that variations and modifications of the various embodiments shown and described herein may be made without departing from the spirit and scope of the invention. Accordingly, it is intended that the invention be limited only to the extent required by the appended claims and the applicable rules of law.

We claim:

1. A system for dynamically assessing a vehicle characteristic comprising:
a torque sensor associated with a power transmission shaft of a transfer case for outputting an electronic signal representing a measured torque of the power transmission shaft at a present state condition of the vehicle, wherein the torque sensor comprises:
a portion of the power transmission shaft that has been endowed with a magnetically conditioned region integral to a portion of the shaft and extending circumferentially around the shaft and into the shaft a distance radially from its surface;
wherein the magnetically conditioned region includes two or more axially extending and circumferentially magnetically polarized bands or regions, wherein adjacent bands or regions are magnetically polarized in alternating circumferential directions; and
at least two non-contact magnetic field vector sensors near the magnetically conditioned region have their sensing directions arranged to determine the direction of rotation of the power transmission shaft by detecting a magnetic flux extending from the surface of the magnetically conditioned region; and
at least one electronic control unit adapted to storing one or more signal processing modules for receiving the electronic signal from the power transmission shaft torque sensor, calculating the vehicle characteristic based on the received electronic signal, and outputting, based on the calculated vehicle characteristic, an output signal for use in altering the state of the vehicle during operation.

2. The system of claim 1, wherein two non-contact magnetic field vector sensors are arranged at the same axial position of one of the polarized bands or regions and circumferentially separated by an azimuth angle of about 180-degrees, and wherein two non-contact magnetic field vector sensors are arranged at the same axial position of one of the other polarized bands or regions and circumferentially separated by an azimuth angle of about 180-degrees.

3. The system of claim 1, further comprising one or more secondary magnetic field sensors for outputting a signal reflecting a magnetic noise from one or more near or far field ambient magnetic fields.

4. The system of claim 1, further comprising a transfer case housing enclosing at least a portion of the power transmission shaft, the housing made of a material having low permeability with regard to the magnetic flux emanating from the magnetically conditioned region when a torque is applied to the power transmission shaft.

5. The system of claim 4, further comprising:
a second torque sensor integral to a portion of the transfer case housing at a location where the housing connects to a transmission, the torque sensor for outputting an electronic signal representing a measured torque at the location where the transfer case housing and transmission connect.

6. The system of claim 5, wherein the second torque sensor is a disk-type torque sensor integral to a portion of the transfer case housing at a location where the housing mates with a housing of the transmission, the disk-type torque sensor for outputting an electronic signal representing a measured torque at the location where the two housings are mated.

7. The system of claim 1, further comprising:
a second power transmission shaft torque sensor at a differential end of the shaft, the second power transmission shaft torque sensor for outputting an electronic signal; or
left and right half-shaft axle torque sensors for outputting respective electronic signals;
wherein the at least one electronic control unit is further adapted to storing the one or more signal processing modules for receiving the electronic signal from the power transmission shaft torque sensor at the transfer case and either or both of the electronic signal from the second power transmission shaft torque sensor at the differential end, representing a measured torque of the power transmission shaft, or the electronic signals from the left and right half-shaft axle torque sensors, representing a measured torque of each of the left and right half-shaft axles, calculating the vehicle characteristic based on the received electronic signals, and outputting, based on the calculated vehicle characteristic, an output signal for use in altering the current state of the vehicle during operation.

8. A system for dynamically assessing a vehicle characteristic comprising:
a torque sensor associated with a power transmission shaft of a transfer case for outputting an electronic signal representing a measured torque of the power transmission shaft at a present state condition of the vehicle, wherein the torque sensor comprises:
a portion of the power transmission shaft that has been endowed with a magnetically conditioned region integral to a portion of the shaft and extending circumferentially around the shaft and into the shaft a distance radially from its surface;
at least four non-contact magnetic field vector sensors near the magnetically conditioned region have their sensing directions arranged to determine the direction of rotation of the power transmission shaft by detecting a magnetic flux extending from the surface of the magnetically conditioned region;
wherein a first two non-contact magnetic field vector sensors are arranged at an axial position of a first polarized band or region of the magnetically conditioned region of the shaft, the first two sensors circumferentially separated by an azimuth angle of about 180-degrees, and wherein a second two non-contact magnetic field vector sensors are arranged at an axial position of a second polarized band or region of the magnetically conditioned region of the shaft, the second two sensors circumferentially separated by an azimuth angle of about 180-degrees; and
at least one electronic control unit adapted to storing one or more signal processing modules for receiving the electronic signal from the power transmission shaft torque sensor, calculating the vehicle characteristic based on the received electronic signal, and outputting, based on the calculated vehicle characteristic, an output signal for use in altering the state of the vehicle during operation.

9. The system of claim 8, further comprising one or more secondary magnetic field sensors for outputting a signal reflecting a magnetic noise from one or more near or far field ambient magnetic fields.

10. The system of claim 8, further comprising a transfer case housing enclosing at least a portion of the power transmission shaft, the housing made of a material having low permeability with regard to the magnetic flux emanating from the magnetically conditioned region when a torque is applied to the power transmission shaft.

11. The system of claim 10, further comprising:
a second torque sensor integral to a portion of the transfer case housing at a location where the housing connects to a transmission, the torque sensor for outputting an electronic signal representing a measured torque at the location where the transfer case housing and transmission connect.

12. The system of claim 11, wherein the second torque sensor is a disk-type torque sensor integral to a portion of the transfer case housing at a location where the housing mates with a housing of the transmission, the disk-type torque sensor for outputting an electronic signal representing a measured torque at the location where the two housings are mated.

13. The system of claim 8, further comprising:
a second power transmission shaft torque sensor at a differential end of the shaft, the second power transmission shaft torque sensor for outputting an electronic signal; or
left and right half-shaft axle torque sensors;
wherein the at least one electronic control unit is further adapted to storing the one or more signal processing modules for receiving the electronic signal from the power transmission shaft torque sensor at the transfer case and either or both of the electronic signal from the second power transmission shaft torque sensor at the differential end, representing a measured torque of the power transmission shaft, or the electronic signals from the left and right half-shaft axle torque sensors, representing a measured torque of each of the left and right half-shaft axles, calculating the vehicle characteristic based on the received electronic signals, and outputting, based on the calculated vehicle characteristic, an output signal for use in altering the current state of the vehicle during operation.

14. A system for dynamically assessing a vehicle characteristic comprising:
a torque sensor associated with a power transmission shaft of a transfer case for outputting an electronic signal representing a measured torque of the power transmission shaft at a present state condition of the vehicle, wherein the torque sensor comprises:
a portion of the power transmission shaft that has been endowed with a magnetically conditioned region integral to a portion of the shaft and extending circumferentially around the shaft and into the shaft a distance radially from its surface; and
at least two non-contact magnetic field vector sensors near the magnetically conditioned region have their sensing directions arranged to determine the direction of rotation of the power transmission shaft by detecting a magnetic flux extending from the surface of the magnetically conditioned region;
at least one electronic control unit adapted to storing one or more signal processing modules for receiving the electronic signal from the power transmission shaft torque sensor, calculating the vehicle characteristic based on the received electronic signal, and outputting, based on the calculated vehicle characteristic, an output signal for use in altering the state of the vehicle during operation; and
one or more secondary magnetic field sensors for outputting a signal reflecting a magnetic noise from one or more near or far field ambient magnetic fields.

15. The system of claim 14, wherein the magnetically conditioned region includes two or more axially extending and circumferentially magnetically polarized bands or regions, wherein adjacent bands or regions are magnetically polarized in alternating circumferential directions.

16. The system of claim 15, wherein a first two non-contact magnetic field vector sensors are arranged at an axial position of one of the polarized bands or regions and circumferentially separated by an azimuth angle of about 180-degrees, and wherein a second two non-contact magnetic field vector sensors are arranged at an axial position of one of the other polarized bands or regions and circumferentially separated by an azimuth angle of about 180-degrees.

17. The system of claim 14, further comprising a transfer case housing enclosing at least a portion of the power transmission shaft, the housing made of a material having low permeability with regard to the magnetic flux emanating from the magnetically conditioned region when a torque is applied to the power transmission shaft.

18. The system of claim 17, further comprising:
a second torque sensor integral to a portion of the transfer case housing at a location where the housing connects to a transmission, the torque sensor for outputting an electronic signal representing a measured torque at the location where the transfer case housing and transmission connect.

19. The system of claim 18, wherein the second torque sensor is a disk-type torque sensor integral to a portion of the transfer case housing at a location where the housing mates with a housing of the transmission, the disk-type torque sensor for outputting an electronic signal representing a measured torque at the location where the two housings are mated.

20. The system of claim 8, further comprising:
a second power transmission shaft torque sensor at a differential end of the shaft, the second power transmission shaft torque sensor for outputting an electronic signal; or
left and right half-shaft axle torque sensors for outputting respective electronic signals;
wherein the at least one electronic control unit is further adapted to storing the one or more signal processing modules for receiving the electronic signal from the power transmission shaft torque sensor at the transfer case and either or both of the electronic signal from the second power transmission shaft torque sensor at the differential end, representing a measured torque of the power transmission shaft, or the electronic signals from the left and right half-shaft axle torque sensors, representing a measured torque of each of the left and right half-shaft axles, calculating the vehicle characteristic based on the received electronic signals, and outputting, based on the calculated vehicle characteristic, an output signal for use in altering the current state of the vehicle during operation.

* * * * *